United States Patent [19]

Draper

[11] 4,192,002

[45] Mar. 4, 1980

[54] APPARATUS AND METHODS FOR POSITION DETERMINING AND PLOTTING

[75] Inventor: George L. Draper, Camp Springs, Md.

[73] Assignee: Nav-All, Incorporated, Camp Springs, Md.

[21] Appl. No.: 875,009

[22] Filed: Feb. 3, 1978

[51] Int. Cl.² .............................................. G06F 15/50
[52] U.S. Cl. .................................. 364/449; 364/520; 340/24
[58] Field of Search ............... 364/424, 444, 447, 448, 364/449, 460, 520; 340/24

[56] References Cited

U.S. PATENT DOCUMENTS

| 3,043,514 | 7/1962 | Smith, Jr. | 364/460 |
| 4,071,895 | 1/1978 | Wood et al. | 364/449 |
| 4,086,632 | 4/1978 | Lions | 364/448 |

Primary Examiner—Felix D. Gruber
Attorney, Agent, or Firm—Larson, Taylor & Hinds

[57] ABSTRACT

Apparatus and methods are disclosed wherein the relative location of a point of position is mathematically determined based solely on knowledge of the included angles defined by an observation point and three non-colinear reference points, and of the distance between the three reference points. Apparatus and methods are also disclosed for position determining and position plotting which are not dependent on the existence of a predetermined or known relationship between the frames of reference defined for a chart, a plotter, and an external frame of reference for the positional data which is utilized to determine position.

27 Claims, 10 Drawing Figures

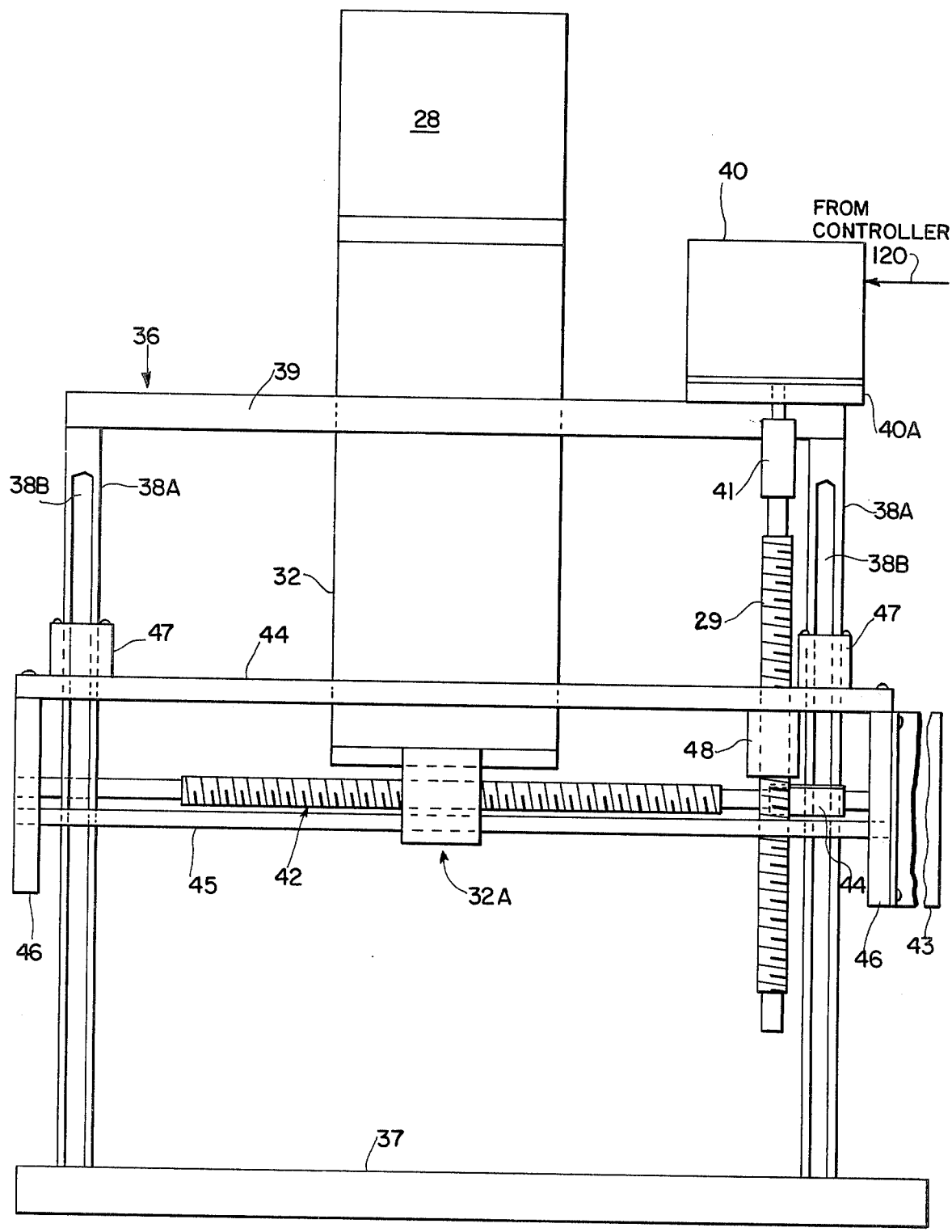

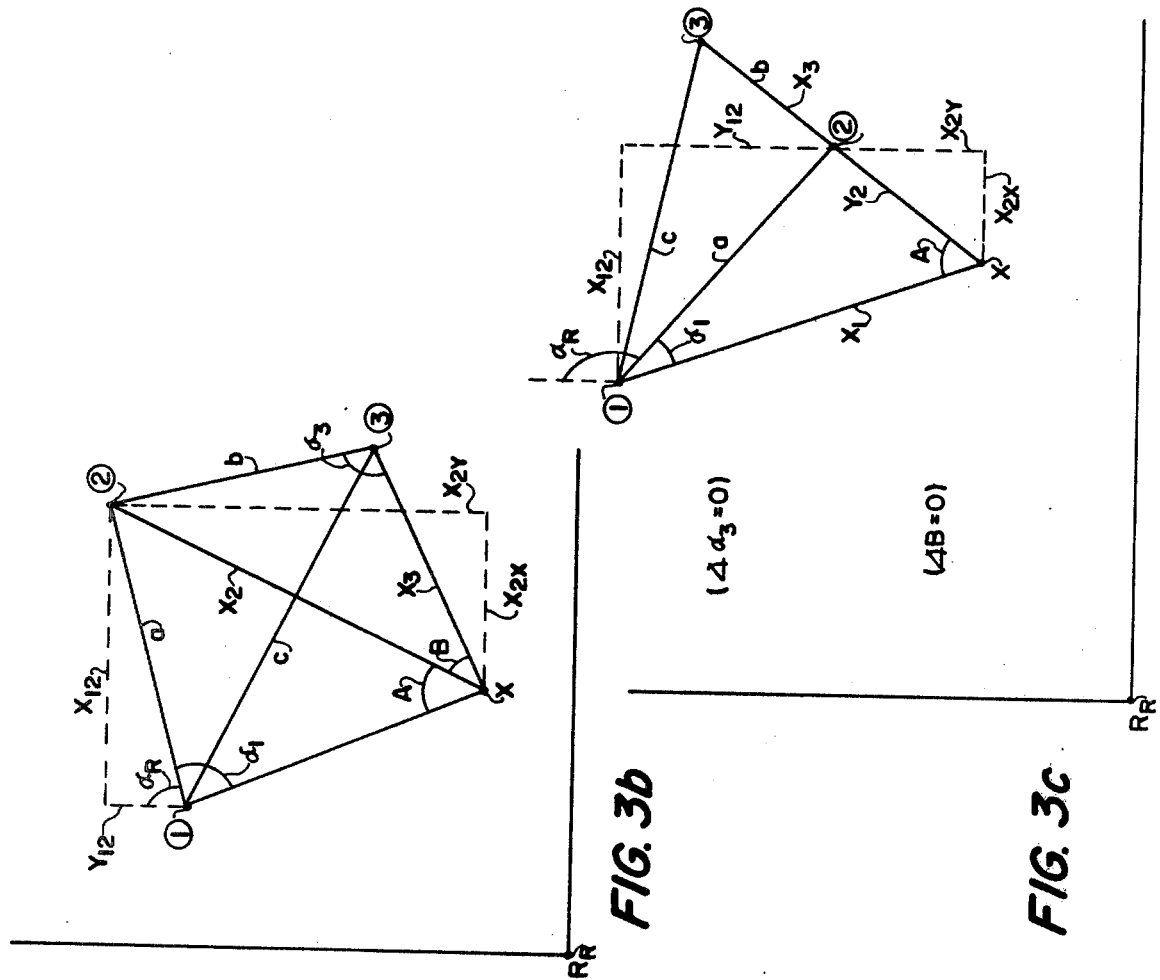
FIG. 3b
FIG. 3c
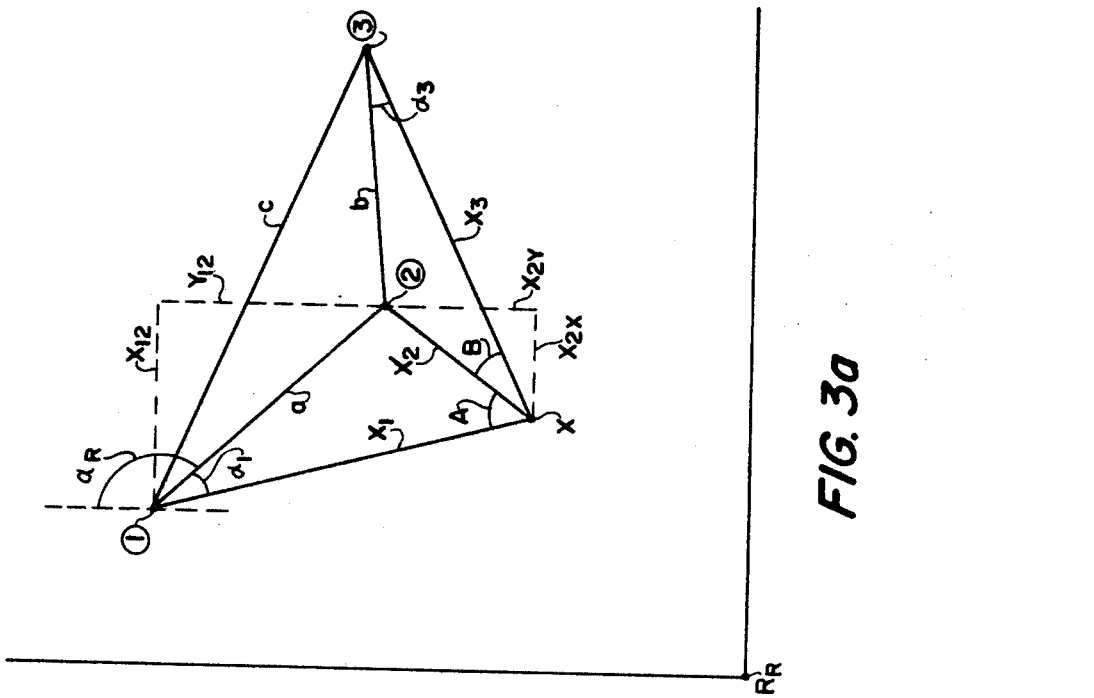
FIG. 3a

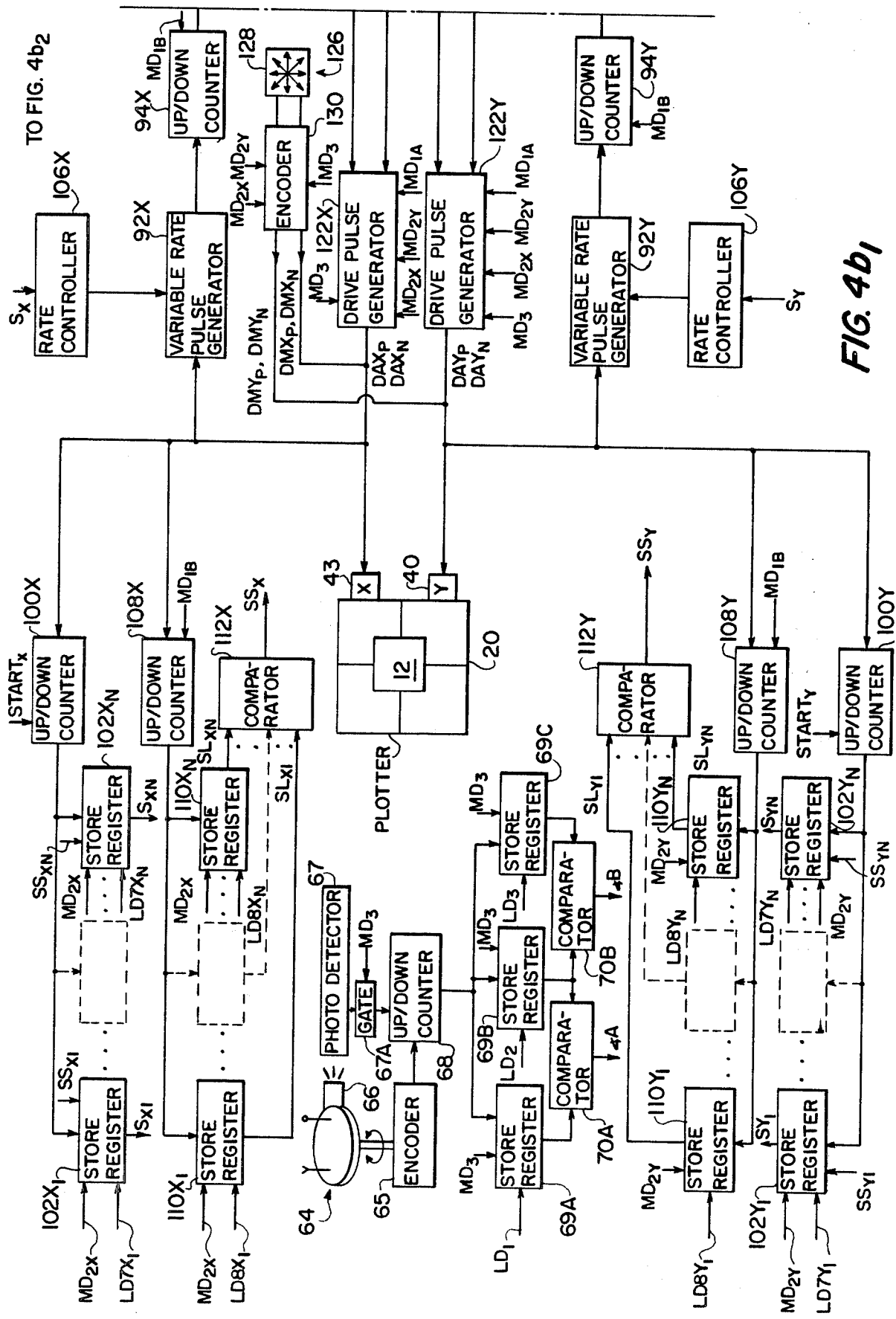
FIG. 4b₁

FIG. 4b₂

APPARATUS AND METHODS FOR POSITION DETERMINING AND PLOTTING

FIELD OF THE INVENTION

The present invention relates in general to methods and apparatus for position determining and for plotting, and more particularly to navigation methods and apparatus for calculating the relative position of a vessel and/or for plotting calculated positions on a navigation chart.

BACKGROUND OF THE INVENTION

There are a great many situations in which it is necessary to determine the relative position or location of an object or feature, and/or in which information pertaining to relative position or location must be displayed in other than a purely numerical form in order to be meaningful or useful. Navigation is one field in which the ability to determine the display accurately relative positions is of critical importance, but for which the ability has heretofore been only partially attained. Although there are occasions, such as, for example, when a marine vessel is traversing the high seas, when navigation can be a comparatively leisurely process, since only a few navigational observations are required at relatively long intervals, and errors in position can usually be detected and corrected before danger threatens, the situation is drastically different in "pilot waters", or their land, air or space equivalent, where the danger of running afoul of obstructions is often imminent, frequent changes of course and speed are common, and the proximity of other vessels increases the possibility of collisions and restricts movement. In this type of situation, frequent, or even continuous, positioning with respect to charted features is necessary. Except for special circumstances, such as where a vessel is proceeding along a range, this positioning normally must be effected by constructing a plot on a chart based upon accurate navigational observations of charted features.

In pilot waters, or their equivalent, the speed and accuracy with which the necessary observations are made, the necessary calculations are performed, and the resulting information is plotted can mean the difference between safety and disaster. In recognition of this fact, much effort has been devoted in the prior art to the development of more precise and reliable navigational aids with which to obtain the raw data on relative position, of more efficient and powerful position-determining computers with which to convert the raw data into readily plotted information, and of faster, more flexible, and more accurate automated plotters with which to construct the plot.

However, conventional navigation systems which do not employ geometrical principles, whether they utilize simple mechanical calculators or complex electronic computers, have in general been characterized by the need for input data pertaining to the distance of the vessel from selected reference points and/or to the bearing of the vessel relative to selected reference points as defined with respect to an external frame of reference. As a consequence, complex, expensive, and delicate direction and distance finding equipment has been required, the high cost and fragility of which have discouraged more widespread use of such navigation systems. Further, applicant is aware of only one position-determining technique, described in Bowditch's *The American Practical Navigator* at Sections 1102–1103, wherein the distance of the vessel from selected reference points need not be known, and bearing information which is not referenced to an external coordinate system is used. However, this method, which is based on the geometrical principle that for any pair of observed points there is only one circle (the circle of equal angles) which passes through the two points and the observer's position, requires either the use of a special three-arm protractor or the actual construction of circles of equal angles. Such geometric constructions are laborious, error-prone, and time-consuming, if done manually, and most difficult and cumbersome to implement in an automated plotter.

Accordingly, it is an object of the present invention to provide a navigation system which automatically calculates and plots a vessel's position without the need either for measurement of the distance of the vessel with respect to any reference point, or for observation of reference points which are related to an external coordinate system.

It is another object of the present invention to provide a navigation system wherein the chart on which the vessel position is plotted itself serves as a data base from which data necessary to determine vessel position is derived.

It is an additional object of the present invention to provide an integrated position-determining and plotting navigation system wherein the chart on which the vessel position is plotted need not be aligned with any predetermined frame of reference associated with the plotter and neither the plotter nor the chart need be aligned with a predetermined frame of reference external to the navigation system, such as magnetic north.

It is a still further object of the present invention to provide a navigation system which can mathematically determine a vessel's position based solely on knowledge of the included angles defined by an observation point and three non-colinear reference points, and of the distance between the three reference points.

It is a further object of the present invention to provide a navigation system of high accuracy which nonetheless can utilize the simplest aids to navigation to obtain the requisite observations of reference points.

It is yet another aspect of the present invention to provide a low cost navigation system of modular design which is readily transportable, easily adapted to existing aids to navigation, and easily expanded in capability.

It is an additional object of the invention to provide position determining and position plotting apparatus and methods which have general utility, and which are compatible with existing position determining/plotting methods.

SUMMARY OF THE INVENTION

These and other objects are obtained by implementation of the position determining and position plotting methods of the present invention. In accordance with the position determining method of the present invention, the included angles A and B between an observation point and the first and second, and the second and third, respectively, of three reference points which are spaced so as to define a triangle are obtained; as are the distances a, b, and c between the first and second, second and third, and first and third reference points, respectively.

If either angle A or angle B is equal to 180°, then effective values of angles A and B are obtained to be used in the following formulas, wherein the effective value of the angle whose measured value is 180° is equal to the value of the measured angle which does not equal 180°, and the effective value of the angle whose measured value does not equal 180° is equal to 180° minus the measured value which does not equal 180°. Correspondingly effective values of distances a, b, and c are also obtained, wherein the effective values of distances a, b, and c equal the measured values of distances c, a, and b, respectively, if the measured value of angle A equals 180°, and equal the measured values of distances b, c, and a, respectively, if the measured value of angle B equals 180°.

The value of a factor $\alpha$ is then obtained, where $\alpha$ is defined by the formula:

$\alpha = \arctan M$, if factor M is positive, and by the formula:

$\alpha = 180° - \arctan |M|$, if factor M is negative, for all values of a factor L which do not equal zero or 180°, and is defined by the formula:

$\alpha = 90°$ when $L = 0°$ or $180°$, and $$M = \frac{\sin L}{K + \cos L};$$

$L = |\theta_o - (A+B)|;$ $\theta_o = \theta_o'$ if $A + B < 180°$, and, if $A + B \leq 180°$, $\theta_o$ equals the one of the values, $\theta_o'$, or $360° - \theta_o'$, which results in values of the factors $X_1$, $X_2$, and $X_3$ defined hereinbelow such that the calculated value of angle A or B, as determined by a formula employing distance a or b, respectively, and at least one of the calculated factors $X_1$, $X_2$, and $X_3$, equals the measured value of angle A or B, $$\theta_o' = 2 \tan^{-1}\left[\sqrt{\frac{(s-a)(s-b)}{s(s-c)}}\right];$$
$s = \frac{1}{2}(a + b + c);$
$K = \frac{a}{b} \frac{\sin B}{\sin A}$ or $K = \frac{b}{a} \frac{\sin A}{\sin B}.$ The value of another factor $\theta_x$ is then obtained, wherein $\theta_x$ is defined by the formula:

$\theta_x = 180° - \alpha - Q,$ and $Q = B$ if $K = \frac{a}{b} \frac{\sin B}{\sin A}$, and
$Q = A$ if $K = \frac{b}{a} \frac{\sin A}{\sin B}.$ The value of the distance between the observation point and the first reference point may then be derived by obtaining the value of a factor $X_1$, wherein $X_1$ is defined by the formula:

$$X_1 = \frac{a \sin \theta_x}{\sin A} \text{ with } Q = A,$$

and the value of the distance between the observation point and the third and second reference points, respectively, may then be derived by obtaining the values of factors $X_3$ and $X_2$, which are defined, respectively, by the formulas:

$X_3 = \frac{b \sin \theta_x}{\sin B}$, with $Q = B$; and
$X_2 = \frac{a \sin \alpha}{\sin A}$ if $K = \frac{a}{b} \frac{\sin B}{\sin A}$ or
$X_2 = \frac{b \sin \alpha}{\sin B}$ if $K = \frac{b}{a} \frac{\sin A}{\sin B}$.

In accordance with the plotting method of the present invention, the relative location of the observation point with respect to a reference point, which relative location of the observation point may advantageaously be determined, in accordance with a further aspect of the present invention, using the position determining method of the present invention, is translated into a corresponding relative position, with respect to a reference position, of a chart on which the reference point is charted.

In accordance with one aspect of the invention, the plotting method of the present invention is implemented by apparatus comprising a plotter having indicia defining a position point and a drive mechanism for effecting relative displacement of the chart and position point with respect to each other such that the position point may be aligned with different chart locations, a chart tracker which produces at least one output indicative of the net relative displacement of the chart and position point with respect to a reference position, and translating apparatus comprising a plotter controller for positioning the chart and position point with respect to each other such that the position point is aligned with a selected chart location, means for obtaining, as the relative position of the selected map location, the value of the at least one output of the chart tracker which is obtained when the selected chart location and the position point are aligned with each other, and a resolver for resolving the distance X between the observation point and reference point into a net relative displacement of the chart and position point from the reference point to the observation point, and for algebraically adding the value thereof to the value of the corresponding relative position for the reference point, and thereby obtaining the relative position of the observation point.

In accordance with a further aspect of the invention, the plotter driver is constructed so as to effect relative displacement of the chart and position point in first and second directions which are parallel to first and second orthognal coordinate axes, respectively, the tracker produces first and second outputs which are indicative of the net relative displacement of the chart and position point with respect to the first and second coordinate directions, respectively, and the resolver resolves the distance X between the observation point and reference point into first and second components of net relative displacement with respect to the first and second coordinate axes, respectively, using the translation/resolving method of the present invention.

In accordance with the translation method of the present invention, the corresponding relative position coordinates, $R1_x$, $R1_y$, $R2_x$, $R2_y$, respectively, between two reference points are compared to obtain the differences $X_{12}$ and $Y_{12}$, respectively, therebetween. A value of a factor $\alpha_R$ is then obtained, wherein $\alpha_R$ is defined as follows:

I. If $R2_x > R1_x$ and $R2_y > R1_y$, then $$\alpha_R = \tan^{-1}\frac{|X_{12}|}{|Y_{12}|};$$

II. If $R2_x > R1_x$ and $R2_y < R1_y$, then $$\alpha_R = 180° - \tan^{-1}\frac{|X_{12}|}{|Y_{12}|};$$

III. If $R2_x < R1_x$ and $R2_y < R1_y$, then $$\alpha_R = \tan^{-1}\frac{|X_{12}|}{|Y_{12}|} + 180°;$$

IV. If $R2_x < R1_x$ and $R2_y > R1_y$, then $$\alpha_R = 360° - \tan^{-1}\frac{|X_{12}|}{|Y_{12}|};$$

V. If $R2_x = R1_x$ and $R2_y > R1_y$, then $\alpha_R = 0°$;
VI. If $R2_x = R1_x$ and $R2_y < R1_y$, then $\alpha_R = 180°$;
VII. If $R2_x > R1_x$ and $R2_y = R1_y$, then $\alpha_R = 90°$;
VIII. If $R2_x < R1_x$ and $R2_y = R1_y$, then $\alpha_R = 270°$.

A value A of the included angle defined between the two reference points, as viewed from the observation point, and the value of the factor $\alpha$ referred to hereinabove are obtained, and the value of a factor $\alpha_S$ is then obtained, which is defined as follows:

$$\alpha_S = \alpha_R + \alpha + A \text{ if } A + B \leq 180°, \text{ and}$$

$$\alpha_S = \alpha_R + \alpha + A - 180° \text{ if } A + B > 180°.$$

The magnitudes $X_x$ and $X_y$, respectively, of the first and second net relative displacement components are then obtained as follows:

$$X_x = X \sin \alpha_S$$

$$X_y = X \cos \alpha_S$$

$X_x$ and $X_y$ are added to the corresponding relative position coordinates of the reference point to obtain the relative position coordinates of the observation point if $\sin \alpha_S$ and $\cos \alpha_S$, respectively, are positive; and $X_x$ and $X_y$ are subtracted from the corresponding relative position coordinates of the reference point to obtain the relative position coordinates of the observation point if $\sin \alpha_S$ and $\cos \alpha_S$, respectively, are negative.

Other aspects and advantages of the invention will be set forth in, or apparent from, the detailed description of the preferred embodiments found hereinbelow.

BRIEF DESCRIPTION OF THE DRAWINGS

FIG. 2a is a simplified plan view with portions omitted for the sake of clarity of a preferred embodiment of the plotter 20 constituting a part of the navigation system depicted in FIG. 1.

FIG. 2b is a simplified side elevational view of plotter 20 depicted in FIG. 2a.

FIGS. 3a-3c are graphical representations of illustrative relationships between reference points and an observation point to which the position determining and plotting methods and apparatus of the present invention apply.

Figure 1:
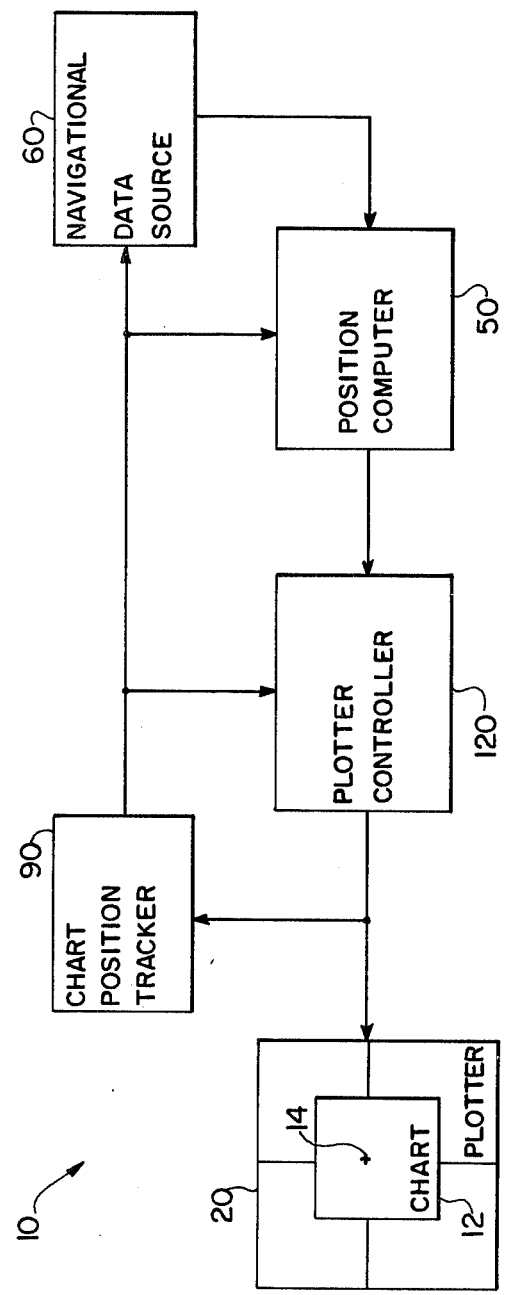
FIG. 1 is a highly simplified block diagram illustrating the basic components of a position determining and plotting navigation system constructed in accordance with the present invention.

FIGS. $4b_1$, $4b_2$ and $4c$ are more detailed schematic digarams of a preferred embodiment of the navigation system illustrated in FIG. 1.

DETAILED DESCRIPTION OF PREFERRED EMBODIMENTS

Referring to the simplified block diagram of FIG. 1, the basic components and organization of a position determining and plotting navigation system constructed in accordance with the present invention will now be described. The system, generally denoted 10, comprises a plotter 20 for effecting relative displacement of a navigational chart 12 with respect to indicia defining a point of position (POP) 14 such that POP 14 may be aligned with different chart locations; a position computer 50 for determining the location of the vessel with respect to a charted reference point based on navigational data supplied by a source 60 thereof, and for translating the relative location of the vessel into a relative position of chart 12 in plotter 20 which is defined with respect to a reference chart position and which is such that POP 14 denotes on chart 12 the location of the vessel; a chart position tracker 90 for determining the current position of chart 12 with respect to the reference position; and a plotter controller 120 for driving plotter 20 under manual control, and in response to control signals generated by computer 50 and position tracker 90. As will be explained in more detail hereinbelow, the preferred embodiment of position tracker 90 senses the drive pulses produced by plotter controller 120, and is thus connected to the output of controller 120 in FIG. 1. However, it is to be noted that tracker 90 may be adapted so as to be connected, for example, to plotter 20 and to sense chart displacement directly. Further, as will be explained in more detail hereinbelow in a preferred embodiment of system 10, navigational information pertaining to the relative locations of reference points which is utilized by computer 50 is automatically translated into relative positions of chart 12 by tracker 90, and the output of tracker 90 is thus shown as connected as an input to computer 50, data source 60, and plotter controller 120. However, it is to be noted that the invention is not limited to this arrangement, as will become apparent from the description hereinbelow.

Plotter 20 may be of any conventional design. Relative displacement of chart 12 with respect to POP 14 may be effected by having a displaceable chart 12 and fixed POP defining indicia, by having displaceable POP defining indicia and a fixed chart 12, or by having both chart 12 and the POP defining indicia displaceable, as is well known in the art. Further, either the actual chart and/or POP defining indicia may be physically displaced, or optically or electronically produced images thereof may be displaced, as is well known in the art. Preferably, plotter 20 is constructed so as to allow independent relative displacement of chart 12 with respect to each of two coordinate axes. Advantageously, orthogonal coordinate axes, hereinafter referred to as X and Y coordinate axes, are employed. As noted hereinabove, the frame of reference defined by the coordinate axes of relative displacement for plotter 20 may have an arbitrary orientation with respect to any frame of reference which may be associated with chart 12 and with respect to any frame of reference external to navigation system 10, and whatever orientation the frame of reference defined for plotter 20 may have with respect to any other frames of reference need not be defined or known.

Figure 2B:
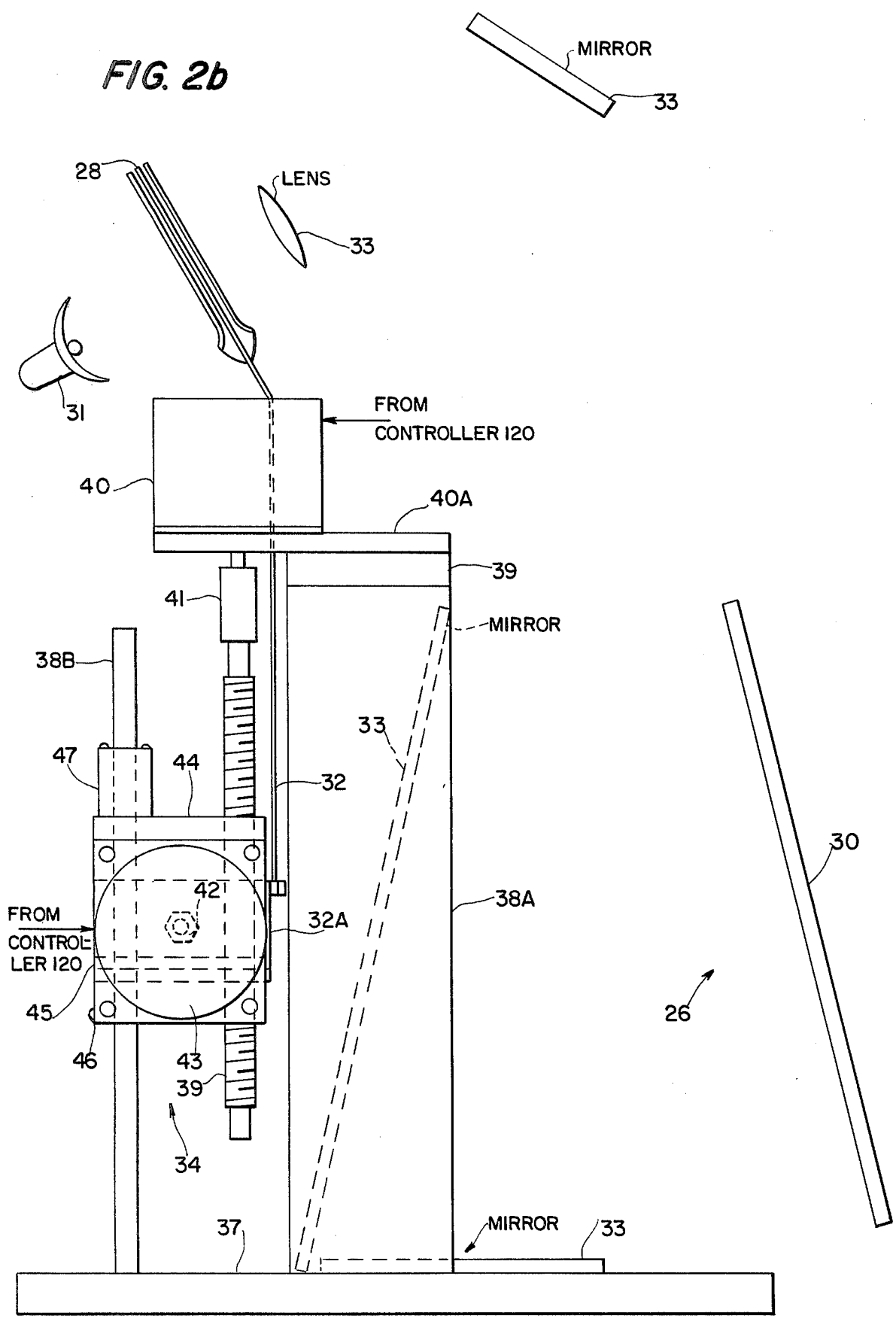

A preferred embodiment of a plotter 20, in which all moving parts are enclosed and thus protected from the elements and other injury, which provides an unobstructed and readily interpreted display, and which is simple, inexpensive, and easily manufactured, yet highly accurate and reliable, is illustrated in FIGS. 2a and 2b. Referring to FIGS. 2a and 2b, the preferred embodiment of plotter 20 comprises a transparency projector, generally denoted 26, which projects an image of a chart 12 (FIG. 1) which has been imposed on a transparency 28 onto a viewing screen 30 using a conventional light source 31 and a conventional lens and mirror arrangement 33. POP 14 is defined on viewing screen 30 by two crosshairs (not shown) which bisect at the center of screen 30. Advantageously, transparency 28 is a color representation of chart 12 which is reduced in scale so as to allow use of a compact, readily transportable projector 26.

Transparency 28 is removably mounted in a film holder 32 which forms a part of a carrier system, generally denoted 34, for effecting independent incremental displacement of transparency 28 in X and Y coordinate directions so as to reflect the longitude and latitude of the vessel's POP or some other feature's position at the point of bisection of the crosshairs of screen 30. It is to be noted that precision of manufacture of film holder 32, such that transparency 28 may be relatively mounted therein with the same orientation with respect to the coordinate axes of relative displacement defined for plotter 20, is unnecessary. Film holder 32 preferably need be constructed only such that transparency 28 is firmly held once mounted, such that whatever orientation relative to the plotter coordinate axes which may result from a particular mounting of transparency 28 in film holder 32 is fixedly maintained during a set of related position computations and plottings. It is also to be noted, as mentioned hereinabove, that the orientation of transparency 28 with respect to any frame of reference which is external to system 10 may be arbitrary, and need not be defined or known.

Carrier system 34 includes a carrier frame, generally denoted 36, having a base 37, two pairs of vertical support columns 38A and 38B projecting from base 37, and a horizontal bridge member 39 connecting the distal ends of the support columns 38A. Carrier system 34 comprises a vertically-oriented lead screw 29, the orientation of which defines the Y coordinate axis of relative chart displacement, coupled to a stepping motor 40 by a coupler 41, and a horizontally-oriented lead screw 42, the orientation of which defines the X coordinate axis of relative chart displacement, coupled to a stepping motor 43 by a coupler 44. As shown, stepping motor 40 is fixedly mounted to bridge member 39 by means of a plate 40A such that lead screw 29 depends downwardly from motor 40 adjacent one of the sets of support columns 38A and 38B. Lead screw 42 and motor 43 are slidably mounted between the pairs of support columns 38 by means of a support frame comprising upper and lower stabilizing rods, denoted 44 and 45, respectively, which are connected at each end by side plates 46. Stepping motor 43 is mounted on one side plate 46 and the distal end of lead screw 42 is rotatably mounted in the other side plate 46, as shown. Upper stabilizing rod 44 is slidably mounted to the corresponding support frame column 38B by bearing blocks 47, and is drivenly coupled to lead screw 29 by a threaded nut 48.

The base 32A of film holder 32 is slidably mounted on lower stabilizing rod 45, and also is provided with a threaded bore by which transparency 28 is drivenly coupled to lead screw 42, as shown. As should be apparent from the foregoing, transparency 28 may be selectively displaced along paths which are parallel to either the X or Y coordinate axis or which are inclined at an angle with respect thereto, in either plus or minus directions, and in increments of any length, by selectively actuating either one or or both stepping motors 40 and 43, with control pulses having predetermined polarities and durations.

For compactness of transparency projector 26, film holder 32 is angled as shown, such that transparency 28 is disposed at an angle relative to the X-Y coordinate plane defined by the plotter coordinate axes. It is noted that the distance between transparency 28 and the lens of lens and mirror arrangement 33, and hence the focus of the image projected on screen 30, will thus change with displacement of transparency 28 in a Y coordinate direction. However, such change in focus does not affect the operation of system 10, and may be minimized so as to be virtually imperceptible within the limits of Y coordinate direction displacement of plotter 20 in accordance with well known principles of optics.

Position computer 50 may be of any conventional design, either mechanical or electronic, and may be constructed in any conventional manner, such as, for example, by programming a conventional general purpose computer using conventional programming techniques, to determine the location of the vessel relative to a charted reference point in accordance with any known navigational computation technique. Position computer 50 is further advantageously conventionally constructed/programmed so as to test the input data for the existence of predetermined navigational situations for which particular navigational computation techniques apply, and to employ the appropriate computation technique when such a situation exists. If conventional navigational computation techniques are employed, navigational data source 60 simply comprises conventional aids to navigation which supply the input data necessary for the particular navigational techniques being employed.

For "plane sailing" applications (i.e., those wherein distances of less than 200 miles are involved) in which the vessel is not travelling along a "range", or cannot obtain fixes on three reference points which are colinear with respect to each other but not colinear with the vessel point of position, a preferred embodiment of computer 50 is constructed or programmed so as to perform the computation steps of the position determining method of the present invention, to be described hereinbelow, wherein the relative location of the vessel is derived solely from navigational data pertaining to the included angles defined by an observation point associated with the vessel and a set of three charted reference points which define a triangle, and from navigational data pertaining to the distances between the three charted reference points. As will be appreciated by those of ordinary skill in the art, such programming of computer 50 generates means for performing each of the computation steps described herein. As a point of clarification, it is to be noted that the position determining method of the present invention will work when two of the reference points are in range with the observation point, i.e., the two reference points are colinear with the observation point; and thus that the method of the present invention can be used when the vessel is travelling along a range. However, a simpler solution exists for determining the location of the vessel based on the same data when an in range situation exists, as is known in the art, and thus in a preferred embodiment of system 10, computer 50 employs the simpler method when an in range situation is determined to exist.

To facilitate understanding of the position determining method of the present invention, reference is made to FIGS. 3a–3c, wherein the three basic triangular arrangements which can exist for the three reference points are illustrated. Referring specifically to FIGS. 3a and 3b, the three reference points, which are denoted by the circled numerals 1, 2, and 3, respectively, are arranged such that no two of the points are colinear with respect to the observation point, which is denoted X. In the arrangement of FIG. 3a, the intermediate point, as viewed from observation point X, or point 2, is relatively nearer observation point X, and in the arrangement of FIG. 3b, intermediate point 2 is relatively further away from observation point X. Although not shown, it is to be noted that observation point X may be disposed within the boundary of the triangle defined by reference points 1, 2, and 3, as well as without, as shown. If observation point X is disposed within the boundary of the triangle defined by the reference points, then any one of the reference points may be arbitrarily designated as the intermediate point. In the arrangement of FIG. 3c, the intermediate point 2 and an end point, in this case, point 3, are in range with observation point X. Although not shown, it is to be noted that observation point X may be disposed in a colinear relationship with two reference points so as to be between the two reference points, as well as to one side of the points, as shown. As shown, the distance between points 1 and 2 is denoted a, the distance between points 2 and 3 is denoted b, and the distance between points 1 and 3 is denoted c. Further, the included angle defined between observation point X and the reference points 1 and 2 is denoted A, and the included angle defined between observation point X and reference points 2 and 3 is denoted B. In the case of FIG. 3c, included angle B is equal to zero, as indicated. It is also to be noted that it is completely arbitrary as to which of the end points is denoted 1, and which is denoted 3. However, the effect, or significance, of value $\alpha_R$, which is employed in the translation method of the present invention, as will be described in more detail hereinbelow, is dependent on the order in which the reference points are numbered. In FIGS. 3a and 3c, the reference points have been numbered in a counterclockwise direction, while the reference points in FIG. 3c have been numbered in a clockwise direction. In the description hereinbelow of the translation method, a clockwise numbering of the reference points has been assumed.

The first steps of the location determining method of the present invention are to observe the included angles A and B. Preferred apparatus for observing angles A and B will be described hereinbelow.

The next steps of the method are to obtain the distances a, b, and c between the three reference points. Preferred apparatus for obtaining the distances, in which measurements are made directly from chart 12, will be described hereinbelow.

The values of angles A and B are then compared with 180°. If neither angle A nor angle B equals 180°, then the remainder of the method, beginning with the calculation of the value of factor $\alpha$ is performed.

If either angle A or angle B is equal to 180°, which occurs in the situations where observation point X is positioned colinear with, and intermediate between, reference points 1 and 2, and reference points 2 and 3, respectively, then the reference points are redesignated by the redesignation method of the present invention, in which the reference point designations are rotated in the same direction in which the reference points were originally numbered until two effective values A' and B', to be described in more detail hereinbelow, for sighting angles A and B, respectively, are obtained, neither of which is equal to 180°. Corresponding effective values a', b' and c', to be described in more detail hereinbelow, for distances a, b, and c are also obtained, as will be described in more detail hereinbelow, and the effective values of the sighting angles and distances are substituted for the measured values in the various formulas of the remainder of the method.

Effective values A' and B' correspond to the values of the included angles defined between the *redesignated* reference points 1 and 2, and 2 and 3, respectively, for which the included angle between redesignated points 1 and 3 is equal to 180°. Generically, one of the effective values A' and B' will always be equal to the measured value of the sighting angle A or B which does not equal 180°, and the other of the effective values A' and B' will always be equal to 360° minus the sum of the measured angles A and B (which, in the present case, is equivalent to 180° minus the value of the measured angle A or B which does not equal 180°). As a specific example, in the case where angle A is equal to 180°, then effective value A' is equal to the measured angle B, and effective value B' is equal to 180° minus the measured value of angle B.

Effective values a', b' and c' correspond to the values of the distances between *redesignated* reference points 1 and 2, 2 and 3, and 1 and 3, respectively. As will be apparent to those skilled in the art, rotation of the reference point designations one position, which is done if angle A equals 180°, will result in an effective value a' which is equal to the value of measured distance c, an effective value b' which is equal to the value of measured distance a, and an effective value c' which is equal to the value of measured distance b; and rotation of the reference point designations two positions, which is done if angle B equals 180°, will result in an effective value a' which is equal to the value of measured distance b, an effective value b' which is equal to the value of measured distance c, and an effective value c' which is equal to the value of measured distance a.

The next step of the method is to calculate the value of a factor, denoted $\alpha$, which is defined by the formula:

$\alpha = \arctan M$, if factor M is positive, or by the formula:

$\alpha = 180° - \arctan |M|$, if factor M is negative, for all values of a factor, denoted L, wherein $L \neq 0°$ or $180°$, and by the formula:

$\alpha = 90°$, when $L = 0°$ or $180°$.

Factor M is defined by the formula:

$$M = \frac{\sin L}{\frac{1}{-\cos L} + \cos L}, \text{ for all values of factor } L \text{ wherein}$$

$175° \leq L < 180°$ and $180° < L \leq 185°$, $0° < L \leq 5°$, $355° \leq L < 360°$, and by the formula:

$$M = \frac{\sin L}{K + \cos L}, \text{ for all other values of the factor } L.$$

Factor L is defined by the formula:

$$L = |\theta_o - (A+B)|;$$

where factor $\theta_o$ is defined by the formula:

$$\theta_o = \theta_o'$$

or by the formula:

$$\theta_o = 360° - \theta_o',$$

where $$\theta_o' = 2 \arctan \sqrt{\frac{(s-a)(s-b)}{s(s-c)}};$$

and factor s is defined by the formula:

$$s = \tfrac{1}{2}(a+b+c).$$

The formula to be used for defining $\theta_o$ is determined as follows: If the sum of the values of angles A and B is greater than 180°, then $\theta_o = \theta_o'$. If the sum of the values of the angles A and B is less than or equal to 180°, then a value of $\theta_o$ is assumed wherein $\theta_o$ is equal to $\theta_o'$ or $360° - \theta_o'$, and at least value $X_2$ is calculated in accordance with the formula described hereinbelow. A value $A_c$ of angle A is then calculated using measured distance a and the calculated value(s) of the distance(s) X. For example, if only $X_2$ is calculated, then a calculated value of angle A may be advantageously derived from the following formula:

$$\tan\left[\frac{A - \alpha_A}{2}\right] = \frac{a - X_2}{a + X_2}\left[\cot\left(\frac{\theta_x}{2}\right)\right]$$

If both values of $X_1$ and $X_2$ are calculated, then a calculated value of angle A may be advantageously derived from the following formula:

$$\cos A = \frac{X_1^2 + X_2^2 - a^2}{2X_1X_2}.$$

The calculated value $A_c$ of angle A is then compared with the measured value $A_m$ thereof. If $A_c = A_m$, then the assumed value of $\theta_o$ is correct, and the values $X_1$ and $X_3$ which have not previously been calculated may be determined as desired. If $A_c \neq A_m$, then the other formula for $\theta_o$ is employed and values $X_1$, $X_2$, and $X_3$ are calculated as desired in accordance with the formulas described hereinbelow. As will be apparent to those skilled in the art, the value of angle B may be calculated instead of the value of angle A in order to test for the correctness of the value of $\theta_o$ which has been assumed, in which case measured distance b, $\alpha_B$ and calculated value $X_3$ would be obviously substituted for distance a, $\alpha_A$ and value $X_1$ in the foregoing formulas. Factor K is defined by either of the following formulas:

$$K = \frac{a}{b} \frac{\sin B}{\sin A}, \text{ or } K = \frac{b}{a} \frac{\sin A}{\sin B}.$$

It is to be noted that factor $\alpha$ corresponds to the included angle defined between either the first or the third reference points 1 or 3, respectively, and the intermediate reference point 2 and observation point X. Referring to FIG. 3a, the included angle for reference point 1 has been denoted $\alpha_1$, and the value of factor $\alpha$ obtained when $$K = \frac{b}{a} \frac{\sin A}{\sin B}$$

corresponds thereto, and will be referred to hereinafter as $\alpha_A$. The included angle for reference point 3 has been denoted $\alpha_3$ in FIG. 3a, and the value of a factor $\alpha$ obtained when $$K = \frac{a}{b} \frac{\sin B}{\sin A}$$

corresponds thereto, and will be referred to hereinafter as $\alpha_B$.

It is also to be noted that the second formula hereinabove defining factor M can be employed for all values of $L \neq 0°$ or $180°$ if the error can be tolerated which results because of the fact that factor K assumes a substantially constant value as the value of factor L approaches $0°$ ($360°$) or $180°$, particularly in the range of values encompassed within the limits of plus or minus $5°$ of $0°$ ($360°$) or $180°$ and thus unduly influences the value of M.

It is further to be noted that factor L is also equal to the sum of values $\alpha_A$ and $\alpha_B$.

The next step of the method is to calculate the value of a factor, denoted $\theta_x$, which is defined by the formula:

$$\theta_x = 180° - \alpha - Q;$$

where the value of factor Q is equal to the value of angle B if value $\alpha_B$ is used, and is equal to the value of angle A if value $\alpha_A$ is used.

The next step depends on whether the distance from observation point X to reference point 1, 2, or 3 is desired. If the distance from observation point X to the point 1 is desired, then a value $X_1$ is calculated which is defined by the formula:

$$X_1 = \frac{a \sin \theta_x}{\sin A},$$

using the value of factor $\theta_x$ obtained with value $\alpha_A$ and factor Q equal to value A.

If the distance from observation point X to reference point 3 is desired, then a value $X_3$ is calculated which is defined by the formula:

$$X_3 = \frac{b \sin \theta_x}{\sin B},$$

using the value of factor $\theta_x$ obtained with value $\alpha_B$ and factor Q equal to value A.

If the distance from observation point X to reference point 2 is desired, then a value $X_2$ is calculated which is defined by either the formula:

$$X_2 = \frac{a \sin \alpha_A}{\sin A},$$

or by the formula:

$$X_2 = \frac{b \sin \alpha_B}{\sin B}.$$

It is to be noted that if a series of vessel positions are to be computed in accordance with the position determining method of the present invention using the same three reference points, then the reference point designations must be changed as the observation point moves to relative positions where the reference point originally designated as point 2 is no longer intermediate the reference points originally designated 1 and 3, as viewed from the observation point. As should be apparent from the foregoing, sighting angles A and B are always defined as the included angles between the reference points designated 1 and 2, and 2 and 3, respectively, as viewed from the observation point.

It is also to be noted that in those situations where, for a given designation of reference points, the observation point is located such that one of the sighting angles A and B is relatively small, such that it would be considered a "weak fix", as the term is used in the navigation arts, the designation of reference points may advantageously be rotated in the manner described hereinabove with respect to those situations where either of the sighting angles A and B is equal to 180°, so as to obtain the effective values A' and B' which obtain when the included angle defined between the redesignated reference points 1 and 3 is equal to the undesired weak fix measured angle. These effective values A' and B' would be used, along with the corresponding effective values a', b' and c', in the formulas of the position determining method described hereinabove.

Position computer 50 is further constructed/programmed in a conventional manner so as to perform the computations of the translation method of the present invention, as described hereinbelow. It is to be noted that some of the same computations are involved in both the position determining and the translating methods of the present invention, and thus, as will be apparent to those skilled in the art, those computations which are common to both methods are not duplicated in the preferred embodiment of computer 50.

In order to position chart 12 with respect to POP 14 such that POP 14 denotes the chart locations of observation point X, it is sufficient, in accordance with the present invention, to know only one of the distances $X_1$, $X_2$, or $X_3$, and any one of the distances may be used. In the preferred embodiment of system 10, the relative location of the vessel is determined by calculating distance $X_2$. Thus, for convenience and clarity of description, the manner in which observation point X is plotted will be described hereinafter with reference to the reference point 2 illustrated in FIGS. 3a–3c. Further, the positioning of chart 12 in accordance with the present invention entails translation of the chart locations of two of the three reference points 1, 2, and 3 into relative positions of chart 12 in plotter 20 with respect to a reference chart position, and in the description hereinbelow, reference point 1 has been arbitrarily selected. In addition, as will be apparent to those skilled in the art, although the chart positioning method of the present invention allows any chart position to be used as the reference chart position, and allows, if desired, the reference position to be changed from one plot of position to the next so as to coincide with the most recently calculated vessel position, a reference chart position preferably is selected which is at a limit of chart displacement in both coordinate directions, as indicated at point $R_R$, shown in FIGS. 3a–3c, such that a relative chart position can be defined with respect to the reference chart position without reference to positive and negative directions, and the description hereinafter assumes that such a reference chart position has been selected.

With reference to a preferred embodiment of system 10 incorporating the preferred embodiment of plotter 20 described hereinabove, the first step in translating the location of observation point X into a relative chart position in accordance with the present invention is to define X and Y coordinates, relative to the reference chart position, of chart positions corresponding to reference points 1 and 2. The values of these relative X and Y coordinates for reference points 1 and 2 are denoted hereinafter, respectively, as $R1_x$, $R1_y$, and $R2_x$ and $R2_y$. Preferred apparatus and method for defining values $R1_x$, $R1_y$, $R2_x$, and $R2_y$ will be described hereinbelow.

Values $R1_x$ and $R2_x$, and values $R1_y$ and $R2_y$ are compared, respectively, and the differences therebetween, the magnitudes of which correspond, respectively, to a net X-coordinate direction distance value $X_{12}$ and a net Y-coordinate direction distance value $Y_{12}$ between reference points 1 and 2, are obtained. Preferred apparatus for obtaining values $X_{12}$ and $Y_{12}$ will be described hereinbelow.

If value $\alpha_A$ has not already been obtained as a result of performing the preferred method of determining the relative location of observation point X described hereinabove, then value $\alpha_A$ is obtained, which advantageously may be obtained in the manner described hereinabove, but may be obtained in any known manner.

A value, denoted $\alpha_R$, is also obtained, as follows:

I. If $R2_x > R1_x$ and $R2_y > R1_y$, then $$\alpha_R = \tan^{-1} \frac{|X_{12}|}{|Y_{12}|};$$

II. If $R2_x > R1_x$ and $R2_y < R1_y$, then $$\alpha_R = 180° - \tan^{-1} \frac{|X_{12}|}{|Y_{12}|};$$

III. If $R2_x < R1_x$ and $R2_y < R1_y$, then $$\alpha_R = \tan^{-1}\frac{|X_{12}|}{|Y_{12}|} + 180°;$$

IV. If $R2_x < R1_x$ and $R2_y > R1_y$, then $$\alpha_R = 360° - \tan^{-1}\frac{|X_{12}|}{|Y_{12}|};$$

V. If $R2_x = R1_x$ and $R2_y > R1_y$, then $\alpha_R = 0$;
VI. If $R2_x = R1_x$ and $R2_y < R1_y$, then $\alpha_R = 180°$;
VII. If $R2_x > R1_x$ and $R2_y = R1_y$, then $\alpha_R = 90°$;
VIII. If $R2_x < R1_x$ and $R2_y = R1_y$, then $\alpha_R = 270°$.

A value, denoted $\alpha_S$, is then obtained, which is defined by the formula:

$$\alpha_S = \alpha_R + \alpha_A + A, \text{ if } A + B \leq 180°,$$

by the formula:

$$\alpha_S = \alpha_R + \alpha_A + A - 180° \text{ if } A + B > 180°.$$

It is to be noted that the first formula applies to a situation wherein observation point X is outside of, or on one of, the boundaries of the triangle defined by reference points 1, 2, and 3, and the second formula applies to a situation wherein observation point X is inside the boundaries of the triangle defined by the reference point.

A value $X_{2x}$, corresponding to the magnitude of the X component of distance $X_2$, and a value $X_{2y}$, corresponding to the magnitude of the Y component of distance $X_2$, are then obtained, which values are defined by the following formulas:

$$X_{2x} = X_2 \sin \alpha_S$$

$$X_{2y} = X_2 \cos \alpha_S.$$

A value $O_x$, corresponding to the relative X coordinate of observation point X is then obtained as follows: if $\sin \alpha_S$ is positive, then $X_{2x}$ is added to $R2_x$ to obtain $O_x$, and if $\sin \alpha_S$ is negative, then $X_{2x}$ is subtracted from $R2_x$ to obtain $O_x$.

A value $O_y$, corresponding to the relative X coordinate of observation point X is also obtained as follows: if $\cos \alpha_S$ is positive, then $X_{2y}$ is added to $R2_y$ to obtain $O_y$, and if $\cos \alpha_S$ is negative, then $X_{2y}$ is subtracted from $R2_y$ to obtain $O_y$.

As was noted hereinabove, the foregoing description of the translation method assumes that the reference points are numbered in a clockwise fashion. If the reference points are numbered in a counterclockwise fashion, the procedures for obtaining values $O_x$ and $O_y$ would be reversed, i.e., if $\sin \alpha_S$ and $\cos \alpha_S$ are positive, then $X_{2x}$ and $X_{2y}$ would be subtracted from $R2_x$ and $R2_y$, respectively; and if $\sin \alpha_S$ and $\cos \alpha_S$ are negative, then $X_{2x}$ and $X_{2y}$ would be added to $R2_x$ and $R2_y$, respectively.

It will be appreciated by those skilled in the art that although the translation method of the present invention is particularly suited for use in conjunction with the position determining method of the present invention, each method is independent of the other and has a general utility in its own right.

Turning to data source 60 and position tracker 90, preferred embodiments thereof, which are adapted such that navigational data is provided in a form which facilitates implementation of the relative location determining and coordinate translation methods described hereinabove, will now be described with reference to FIGS. 4a-4c.

Figure 4A:
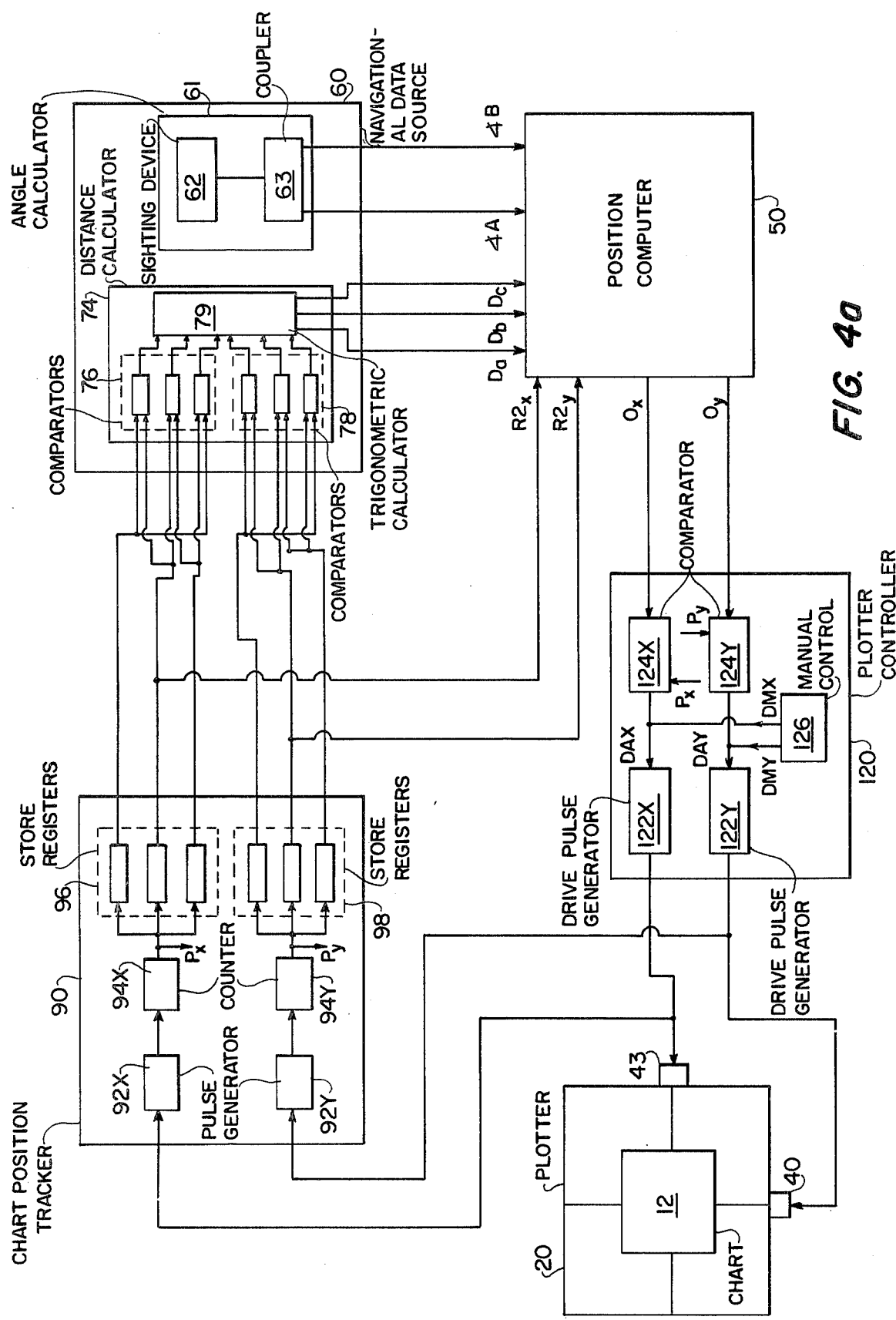
FIG. 4a is simplified schematic block diagram of a preferred embodiment of the navigation system illustrated in FIG. 1.

Referring in particular to FIG. 4a, the preferred embodiment of data source 60 comprises an angle calculator 61 for obtaining included angles A and B, and a distance calculator 74 for obtaining distances a, b, and c. Angle calculator 61 basically comprises a sighting device 62 and a coupler 63 for translating the sighting information produced by sighting device 62 into digital signals representing included angles A and B. Although angle calculator 61 may comprise any conventional aid to navigation from which included angles can be derived, including the most sophisticated direction finding equipment, highly accurate angle data can be obtained with the inexpensive and extremely easy to use preferred embodiment schematically illustrated in FIG. 4b, which comprises a pelorus-type sighting vane 64 mounted on the shaft of a conventional incremental digital shaft encoder 65. Encoder 65 is advantageously of the type wherein a predetermined number of pulses is produced for each 360° of shaft rotation, and the polarity of each pulse is dependent on the direction of shaft rotation. As shown, the preferred embodiment of calculator 61 further comprises a light source 66 mounted on sighting vane 64 for rotation therewith, and a photodetector 67 mounted on encoder 65 so as to be fixedly positioned with respect to sighting vane 64 and to detect the output from light source 66 when source 66 and photodetector 67 are in relative alignment. It is to be noted that the relative location of light source 66 on sighting vane 64 may be completely arbitrary, and need not be aligned with the sighting axis of sighting vane 64 or with any predetermined coordinate axis. A conventional up/down counter 68 is also provided for algebraically summing the output of encoder 65. The output of photodetector 67 is connected to counter 68 as an initializing input via a conventional gate circuit 67 which is constructed so as to connect the output of photodetector 67 to counter 68 only when a control signal MD3, to be described in more detail hereinbelow, is present, and only for the first pulse output produced by photodetector 67 following a generation of control signal MD3. Advantageously, counter 68 is also constructed in a conventional manner so as to automatically reset when the count therein reaches a value corresponding to 360°. Three storage registers 69A, 69B, and 69C, are provided for selectively storing, under the control, respectively, of manually controlled control signals LD1, LD2, and LD3, to be described in more detail hereinbelow, the output of counter 68 once counter 68 has been enabled. Calculator 61 further comprises two comparators 70A and 70B for comparing, respectively, the outputs of registers 69A and 69B, and the outputs of registers 69B and 69C, such that the outputs thereof are indicative of the differences in magnitude between the respective register outputs.

To use the preferred embodiment of angle calculator 61, control signal MD3 is generated, as will be described in more detail hereinbelow, and sighting vane 64 is rotated until counter 68 is initialized by the output of photodetector 67. Sighting vane 64 is then rotated in either a clockwise or counterclockwise direction until reference point 1 is sighted, at which point the then existing output of counter 68 is stored in register 69A by causing control signal LD1 to be generated. Sighting vane 64 is then further rotated in either a clockwise or counterclockwise direction, regardless of the direction in which sighting vane 64 was rotated to sight reference point 1, until reference point 2 is sighted, at which point the then existing output of counter 68 is stored in register 69B by causing control signal LD2 to be generated. Finally, sighting vane 64 is rotated, again in either direction without regard to the direction(s) in which sighting vane 64 was rotated to sight reference points 1 and 2, until reference point 3 is sighted, at which point the then existing output of counter 68 is stored in register 69C by causing control signal LD3 to be generated. With registers 69A, 69B and 69C loaded in the manner just described, the outputs of comparators 70A and 70B are indicative of the magnitudes of included angles A and B, respectively. As should be apparent from the foregoing, the accuracy of the preferred embodiment of calculator 61 is unaffected by the manner in which sighting vane 64 is rotated from one sighting to the next. If, for example, sighting vane 64 is accidentally rotated beyond a reference point, the overshoot pulses counted by counter 68 as a result thereof will be automatically negated if rotation of sighting vane 64 is reversed to return to the desired reference point. Further, should sighting vane 64 be rotated more than one complete revolution in passing from one sighting to the next, the superfluous rotation is without effect since counter 68 automatically resets once the count therein reaches a value corresponding to 360°.

As noted hereinabove, in the preferred embodiment of system 10, navigational chart 12 is utilized as a data base from which the distances between reference points 1, 2, and 3 are derived. Further, in the preferred embodiment of system 10, the chart data is supplied to distance calculator 74 already translated into relative positions of chart 12. Description of distance calculator 74 will thus be deferred until chart position tracker 90 has been described.

Referring to FIGS. 4a and 4b, a preferred embodiment of chart position tracker 90 comprises first and second variable pulse rate pulse generators 92X and 92Y which are actuated, respectively, by the X and Y output drive pulses produced by plotter controller 120, to be described in more detail hereinbelow; first and second up/down counters 94X and 94Y which count the pulses produced by pulse generators 92X and 92Y, respectively, and first and second sets, generally denoted 96 and 98, respectively, of three storage registers, individually denoted 96A, 96B, and 96C, and 98A, 98B, and 98C, respectively, which selectively store the outputs of counters 94X and 94Y, respectively, under the control of manually controlled control signals LD4, LD5, and LD6, respectively, to be described in more detail hereinbelow.

It is to be noted that if only navigational charts 12 are to be used which have the same scale and are of a type wherein the scale does not vary with latitude and longitude, and it is is not desired to have distance data which may be readily displayed in digital form, then pulse generators 92X and 92Y may be omitted. However, pulse generators 92X and 92Y allow system 10 to be calibrated, in a manner to be described hereinbelow, so as to allow use of charts 12 having differing scales, and scales which vary over the range of each chart. Further, comparison of the data stored in the sets of registers 96 and 98 results in values corresponding to scale distances, rather than physical distances, which facilitates digital display thereof, as well as implementation of the position determining method described hereinabove.

For calibration of system 10, tracker 90 further comprises, as shown in FIG. 4b, up/down counter 100X and 100Y which count, respectively, the X and Y output drive pulses produced by plotter controller 120 under the control of manually controlled enabling/initializing signals, denoted $START_x$ and $START_y$, respectively, to be described in more detail hereinbelow; first and second sets of storage registers, generally denoted 102X and 102Y, for selectively storing the outputs of counters 100X and 100Y, respectively, under the control of manually controlled signals, generally denoted LD7X and LD7Y, respectively, to be described in more detail hereinbelow; and an addressing circuit, to be described in more detail hereinbelow, which produces scale selecting control signals, generally denoted $SS_x$ and $SS_y$, for selectively addressing predetermined ones of the storage registers 102X and 102Y, respectively, in dependence on the relative position of chart 12; and conventional rate controllers 106X and 106Y, which produce signals for controlling the pulse rate of generators 92X and 92Y, respectively, in dependence on the outputs of the corresponding ones of the storage registers 102X and 102Y, respectively, which have been addressed by addressing circuit 104.

As shown in FIG. 4b, the addressing circuit referred to hereinabove preferably comprises two counters 108X and 108Y which count, respectively, the X and Y output drive pulses produced by plotter controller 120, two sets of storage registers, generally denoted 110X and 110Y, corresponding in number, respectively to the number $N_x$ of storage registers 102X and the number $N_y$ of storage registers 102Y, for selectively storing the outputs of counters 108X and 108Y, respectively, under the control of manually controlled control signals, generally denoted LD8X and LD8Y, respectively, to be described in more detail hereinbelow; and two comparators 112X and 112Y which compare, respectively, the output of counter 108X with the outputs of storage register 110Y, and which produce predetermined ones of the signals $SS_x$ and $SS_y$, respectively, in dependence on whether the outputs of counters 108X and 108Y are greater than or lesser than the outputs of the corresponding registers 110X and 110Y. Preferably, comparator 112X is constructed such that a first signal $SS_{x1}$ is produced if the output of counter 108X is less than or equal to the output of a first one of the registers 110X, denoted $110X_1$, which signal $SS_{x1}$ addresses a first one of the corresponding storage registers 102X, denoted $102X_1$; a second signal $SS_{x2}$ is produced if the output of counter 108X is greater than the output of register $110X_1$, but less than or equal to the output of a second one of the registers, denoted $110X_2$, which signal $SS_{x2}$ addresses a second one of the corresponding storage registers 102X, denoted $102X_2$; and so on for the remaining registers 110X. Comparator 112Y is constructed similarly to comparator 112X so as to produce similar output signals $SS_{y1}$ through $SS_{yN}$.

The procedure for calibrating system 10 with regard to chart displacement in the X coordinate direction will now be described. It is to be noted that the same procedure is followed for calibrating system 10 with regard to chart displacement in the Y coordinate direction, and thus will not be described. Assuming that system 10 has been initialized, and is operating in a manual plot mode, as will be described in more detail hereinbelow, the calibration procedure is commenced by generating signal START$_x$, which actuates and initializes counter 100X. Plotter controller 120 is then actuated under manual control, in the manner to be described hereinbelow, so as to cause displacement of chart 12 along a calibration path parallel to the X coordinate axis, the physical length of which corresponds to a predetermined scale distance, such as, for example, one mile, based on the scale of the particular chart 12 to be used in system 10, or, if a chart having a varying scale is to be used, a first scale which applies to a region which includes a Y coordinate boundary of chart 12. When the calibration path has been traversed, a predetermined one of control signals LDX, denoted LDX$_1$, is caused to be generated, which causes the output of counter 100X to be stored in storage register 102X$_1$ as a first scale factor S$_{x1}$. Plotter controller 120 is then actuated under manual control so as to cause displacement of chart 12 such that a chart location corresponding to the maximum X coordinate for which scale factor S$_{x1}$ applies is aligned with POP 14. A predetermined one of the load signals LD8X, denoted LD8X$_1$, is then generated, which results in the output of counter 108X being stored in storage register 110X$_1$ as a first scale factor limit SL$_{x1}$. It is to be noted that if only one X-coordinate direction scale is involved, then the X-coordinate which is stored as scale factor limit SL$_{x1}$ would be the X-coordinate corresponding to the maximum relative displacement of chart 12 with respect to the reference chart position which is possible.

If there is more than one X-coordinate direction scale involved, then the foregoing procedure is repeated for each scale, such that a second scale factor S$_{x2}$ is stored in storage register 102X and a corresponding second scale factor limit SL$_{x2}$ is stored in storage register 110X$_2$ and so on, until a scale factor limit which corresponds to the maximum X-coordinate attainable by chart 12 has been stored in the corresponding one of storage registers 110X.

As should be apparent from the foregoing, the number of pulses produced by generators 92X and 92Y per corresponding drive pulse produced by plotter controller 120 will vary in dependence on the relative position of chart 12, in accordance with the X and Y scale factors S$_x$ and S$_y$ which apply to that relative chart position, and thus that the counts in counters 94X and 94Y represent both actual relative position coordinates of chart 12 in plotter 20, and chart location coordinates from which scale distances between relative chart positions can be computed.

As will be apparent to those skilled in the art, scale factors S$_x$ and S$_y$ and scale factor limits SL$_x$ and SL$_y$ need not be encoded into electrical signals utilizing the manually controlled plotter method described hereinabove. For example, conventional digital encoders which convert the settings of conventional multi-position switches into corresponding electrical signals may be employed, wherein predetermined settings of the switches correspond to predetermined scale factors/scale factor limits. Additionally, the scale information may advantageously be prestored in a computer accessible memory, or encoded directly on chart transprancy 28. If the scale information were encoded on transparency 28, plotter 20 would be provided with conventional sensors to read the encoded information, as is well known in the art.

With the preferred embodiment of chart position tracker 90 described hereinabove, distance calculator 74 can simply comprise first and second sets, generally denoted 76 and 78, respectively, of three comparators, individually denoted 76A, 76B, and 76C, and 78A, 78B, and 78C, respectively, and a conventional trigonometric calculator 79, as shown in FIGS. 4a and 4b. Comparator 76A compares the outputs of registers 96A and 96B, comparator 76B compares the outputs of registers 96B and 96C, comparator 76C compares the outputs of registers 96A and 96C; and comparators 78A, 78B, and 78C make the same comparisons between registers 98A, 98B, and 98C as the corresponding comparators 76A, 76B, and 76C make between registers 96A, 96B, and 96C. The outputs of comparator sets 76 and 78 are connected as inputs to trigonometric calculator 79, which is constructed in a conventional manner so as to produce a first output D$_a$ which is indicative of the value of the square root of the sum of the square of the output of comparator 76A and the square of the output of comparator 78A; a second output D$_b$ which is indicative of the value of the square root of the sum of the square of the output of comparator 76B and the square of the output of comparator 76B; and a third output D$_c$ which is indicative of the value of the square root of the sum of the square of the output of comparator 76C and the square of the output of comparator 78C.

In order to obtain the distances a, b, and c, which are used in the preferred method of determining the location of the vessel described hereinabove, plotter controller 120 is actuated under manual control, in the manner to be described hereinbelow, so as to cause displacement of chart 12 such that the chart location of reference point 1 is aligned with POP 14. Control signal LD4 is then caused to be generated, which causes the outputs of counters 94X and 94Y, the values of which correspond, respectively, to values R1$_x$ and R1$_y$ referred to hereinabove, to be loaded into registers 96A and 98A, respectively. The same procedure is repeated for reference points 2 and 3, using control signals LD5 and LD6, respectively, to store values corresponding to values R2$_x$ and R2$_y$ referred to hereinabove in registers 96B and 98B, respectively, and to store values which correspond to the relative X and Y coordinates of reference point 3 in registers 96C and 98C, respectively. The output of comparator 76A consequently corresponds to the net X-coordinate distance X$_{12}$ between reference points 1 and 2; the output of comparator 76B consequently corresponds to the net X-coordinate distance X$_{23}$ between reference points 2 and 3; and the output of comparator 76C consequently corresponds to the net X-coordinate distance X$_{13}$ between reference points 1 and 3; the outputs of comparators 78A, 78B, and 78C consequently similarly correspond, respectively, to the net Y-coordinate distances Y$_{12}$, Y$_{23}$, and Y$_{13}$; and the outputs D$_a$, D$_b$, and D$_c$ of trigonometric calculator 79 consequently correspond, respectively, to distances a, b, and c.

It is to be noted that distances a, b, and c need not be obtained in the manner described hereinabove. For example, the latitude and longitude coordinates of predetermined reference points, which are readily available, as is well known in the art, may be prestored in a computer accessible memory, and selectively addressed as the inputs to a trigonometric calculator of the same type as calculator 79; or values of the actual distances between predetermined reference points may be prestored in a computer accessible memory and selectively addressed as direct inputs to position computer 50.

Referring specifically to FIGS. 4a and 4b, a preferred embodiment of plotter controller 120 comprises two conventional stepper motor drive pulse generators 122X and 122Y which produce pulses for actuating stepper motors 43 and 40, respectively, two conventional comparators 124X and 124Y for comparing the coordinates of a present chart position with the coordinates of a desired chart position and producing drive control signals, generally denoted DAX and DAY, respectively, for controlling drive pulse generators 122X and 122Y, respectively; and a manual control 126 for producing drive signals, generally denoted DMX and DMY, respectively, for drive pulse generators 122X and 122Y.

Drive pulse generators 122X and 122Y are preferably constructed in a conventional manner so as to produce drive pulses of predetermined duration (or number) such that chart 12 is displaced in an increment of predetermined length by each drive pulse(s). Further, drive pulse generators 122X and 122Y are preferably constructed in a conventional manner such that the polarities of the drive pulses which are produced are controllable.

Comparator 124X compares the output, denoted $O_x$, from computer 50, which corresponds to the value $O_x$ referred to hereinabove, with the output, denoted $P_x$, from counter 94X and produces a first drive control signal $DAX_P$ which causes generator 122X to produce a drive pulse having a predetermined polarity such that chart 12 is displaced in a positive X-coordinate direction, i.e., in an X-coordinate direction away from the reference chart position, if output $O_x$ is greater than output $P_x$; produces a second control signal $DAX_N$ which causes pulse generator 122X to produce a drive pulse having a predetermined polarity such that chart 12 is displaced in a negative X-coordinate direction, i.e., in an X-coordinate direction toward the reference chart position, if output $O_x$ is less than output $P_x$; and produces no output if output $O_x$ is equal to output $P_x$. Comparator 124Y similarly compares output $O_y$ from computer 50, which corresponds to the value $O_y$ referred to hereinabove, and the output, denoted $P_y$, from counter 94Y and similarly produces corresponding control signals $DAY_P$ and $DAY_Y$, or no control signal, which similarly control pulse generator 122Y.

Manual control 126 preferably comprises a "joystick" type of manual control lever 128 and a conventional linear encoder 130 for converting the relative direction of movement of lever 128 into the corresponding control signals DMX and DMY. Preferably, as shown, encoder 130 is responsive to displacement of lever 128 in at least eight relative directions, which directions preferably correspond to the four possible X and Y coordinate directions in which chart 12 can be displaced, as well as four relative directions corresponding to the four possible relatively diagonal directions which can result from displacement of chart 12 simultaneously in both an X and Y coordinate direction. An eight degree-of-freedom encoder 130 is preferably constructed so as to selectively produce positive and negative control signals DMX and DMY, denoted $DMX_P$, $DMY_P$, $DMX_N$, and $DMY_N$, respectively, in dependence on whether control lever 128 is displaced in a relative direction which has an X or Y coordinate component, and on whether or not lever 128 is displaced in a relatively positive or in a negative coordinate direction, respectively. Control signals DMX and DMY are connected as inputs to drive pulse generators 122X and 122Y, respectively, as shown.

Figure 4C:
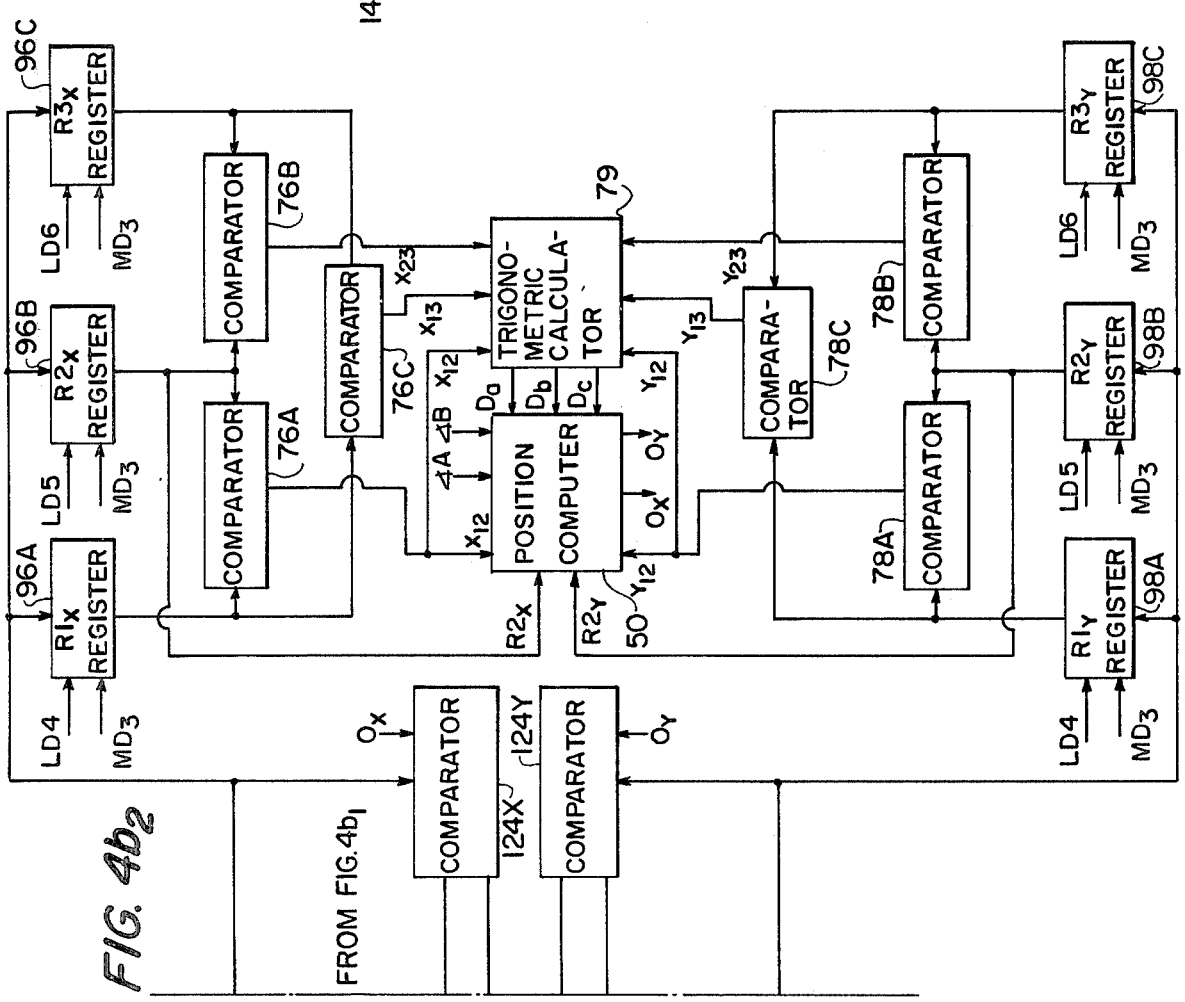

Referring specifically to FIGS. 4b and 4c, the various manually controlled signals LD1-LD8, $START_x$ and $START_y$ referred to hereinabove advantageously are produced by a control module 140 comprising first and second conventional pulse generators 142 and 144, and a conventional logic network circuit 148 which interconnects the outputs of pulse generator 142 and predetermined ones of the outputs of pulse generator 144 in a manner to be described in more detail hereinbelow.

Pulse generator 142 is preferably constructed such that outputs 142A and 142B are produced under the control of manually actuated switches 143A and 143B, respectively. Output 142A causes control signals LD4-LD8, $START_x$, or $START_y$ to be generated, and switch 143A is thus advantageously physically mounted on the end of control lever 128 of manual plotter controller 126. Advantageously, output 142B causes signals LD1-LD3 to be generated, and switch 143B is thus advantageously mounted in proximity to sighting vane 64.

Pulse generator 144 is preferably constructed such that mode control signals, generally denoted MD, are selectively produced under the control of a manually actuated mode selection switch 146. Advantageously, at least four modes of operation are provided for system 10: an initializing mode, for which corresponding mode control signals $MD_{1A}$ and $MD_{1B}$ are produced by generator 144; a scale calibrate mode, for which corresponding mode control signals $MD_{2X}$ and $MD_{2Y}$ are produced; a manual plot mode, for which a corresponding mode control signal $MD_3$ is produced; and a position compute and automatic plot mode, which advantageously is defined by the absence of any mode control signals.

In the interest of clarity, the manner in which mode control signals MD and pulse generator outputs 142A and 142B are interconnected by logic circuit 148 is symbolically indicated in FIG. 4b by representing control signals MD as inputs to the components of system 10 which are controlled by the manual control signals. In addition, it is to be noted that logic circuit 148 is preferably constructed such that control signals $START_x$, LD7X, and LD8X, and control signals $START_y$, LD7Y, and LD8Y are automatically generated in turn by successive actuations of switch 143A when mode control signals $MD_{2x}$ and $MD_{2y}$, respectively, are being generated, and such that the particular one of the control signals LD7 and LD8 which is generated is determined by the number of times the corresponding $START_x$ or $START_y$ signal has been generated. Further, logic network 148 is preferably constructed such that control signals LD1-LD3, and control signals LD4-LD8 are automatically generated in turn by successive actuation of switches 143B and 143A, respectively, when mode signal $MD_3$ is being generated. In addition, manual plotter control 126 and plotter controller 120 are preferably provided with conventional gating circuits (not shown) which control the respective outputs thereof such that in the scale calibrate and manual plot modes, encoder 126 is enabled and plotter controller 120 is disabled, and in the position compute and automatic plot mode, encoder 126 is disabled and plotter controller 126 is enabled.

Control signals $MD_{1A}$ and $MD_{1B}$ are such that in the initializing mode, plotter drive pulse generators 122X and 122Y are actuated by signal $MD_{1A}$ so as to cause relative displacement of chart 12 to the reference chart position, and counters 94X, 94Y, 108X and 108Y are initialized by signal MD$_{1B}$ when chart 12 is positioned at the reference chart position.

In the scale calibrate mode, control signal START$_x$, and thus signals LD7X and LD8X are enabled by mode control signal MD$_{2x}$, and control signal START$_y$, and thus signals LD7Y and LD8Y are enabled by control signal MD$_{2y}$. In addition, as noted hereinabove, manual control encoder 126 is enabled, and plotter controller 120 is disabled by signals MD$_{2x}$ and MD$_{2y}$, thereby allowing selective calibration of system 10 with respect to the X and Y coordinate axes in accordance with the scale of the particular chart 12 utilized.

In the manual plot mode, the outputs of manual control encoder 126 and control signals LD1–LD6 are enabled, and the outputs of plotter controller 120 are disabled, as noted hereinabove, by signal MD$_3$, thereby allowing included angles A and B, and the relative chart position coordinates of reference points 1, 2, and 3 to be entered into system 10.

In the position compute and automatic plot mode, chart 12 is automatically positioned in the manner described hereinabove with respect to POP 14 such that POP 14 denotes the chart location of observation point X as calculated by computer 50.

As should be apparent from the foregoing, when system 10 is switched from the manual plot mode to the position compute and automatic plot mode, chart 12 will be relatively displaced from whatever relative chart position chart 12 happened to be last in at the termination of the manual plot mode so as to be positioned with respect to POP 14 such that POP 14 denotes the chart location of observation point X, and thus there is no need to manually return chart 12 at the end of the manual plot mode to the relative chart position corresponding to the last previously computed location of observation point X.

Although the invention has been described with respect to exemplary embodiments thereof, it will be understood that variations and modifications can be effected in the embodiments without departing from the scope or spirit of the invention. In particular, it will be appreciated by those skilled in the art that the foregoing description of the design of a navigation system constructed in accordance with the present invention refers to discrete components primarily as a matter of convenience and in the interest of clarity, and that many aspects of the design may be readily, and preferably are, implemented by programming a general purpose digital computer. It will be further appreciated by those skilled in the art that the basic design is such that a navigation system constructed in accordance with the present invention may be readily provided with digital displays, and readily adapted so as to, for example, automatically plot dead reckoning courses and the like, control automatic steering systems, or check the accuracy of aids to navigation, including navigational charts which are to be used in the system. Moreover, it is to be noted that the basic design of the present invention is not limited to use in navigation systems, but may be employed in any application, such as, for example, surveying, where it is desired to determine the relative location of an observation point and to plot same on a map or chart.

I claim:

1. Apparatus for determining the relative location of an observation point with respect to a reference point charted on a map, and for plotting the relative location on the map, the apparatus comprising:

plotter means having indicia means defining a position point and drive means for effecting relative displacement of the map and said position point with respect to each other such that said position point may be aligned with different map locations;

means operable when actuated for determining the distances between three charted reference points which are spaced with respect to each other so as to define a triangle, and such that no two of the charted reference points are colinear with the observation point;

means operable when actuated for determining the included angles defined by said three charted reference points and the observation point;

means responsive to said distance determining and to said angle determining means for mathematically determining the relative location of the observation point with respect to at least one of said three reference points based on said included angles and said distances between said three reference points; and means responsive to said location determining means for controlling said plotter means so as to position the map with respect to said position point such that the map location corresponding to the relative location of the observation point is aligned with said position point.

2. The apparatus of claim 1 wherein the reference points constitute first, second and third reference points, with said second reference point being intermediate said first and third reference points, and the magnitudes of the included angles defined between said first and second and said second and third reference points, respectively, constitute values A and B, respectively, and the magnitudes of the distances between said first and second, second and third, and first and third reference points constitute values a, b, and c, respectively, and said means for mathematically determining the relative map location of the observation point comprises:

means for substituting effective values A', B', a', b', and c' for values A, B, a, b, and c, respectively in the formulas herein if value A or value B equals 180°, wherein A'=B, B'=180°−B, a'=c, b'=a, and c'=b, if A=180°, and A'=180°−A, B'=A, a'=b, b'=c, c'=a, if B=180°;

means for obtaining the value of a factor α, wherein said factor α corresponds to the included angle defined between one of said first and third reference points and said second reference point and the observation point, and is defined by the formula α=arctan M, if factor M is positive, and by the formula α=180°−arctan |M|, if factor M is negative, for all values of a factor L wherein L≠0° or 180°, and by the formula α=90° when L=0° or 180°, factor M is defined by the formula $$M = \frac{\sin L}{K + \cos L},$$

factor L is defined by the formula L=|θ$_o$−(A+B)|, factor θ$_o$ is defined by the formula θ$_o$=θ$_o$' if A+B>180° and if A+B≦180°, θ$_o$ equals the one of the values θ$_o$', or 360°−θ$_o$', which results in values of value X obtained as set forth hereinbelow such that the calculated value of angle A or B, as determined by a formula employing distance a or b, respectively, and at least one of the calculated values of value X equals the measured value of angle A or B, $$\theta_o' = 2\tan^{-1}\sqrt{\frac{(s-a)(s-b)}{s(s-c)}},$$

factor s is defined by the formula $s=\frac{1}{2}(a+b+c)$, and factor K is defined either by the formula $$K = \frac{a}{b} \frac{\sin B}{\sin A}$$

or by the formula $$K = \frac{b}{a} \frac{\sin A}{\sin B};$$

means for obtaining the value of a factor $\theta_x$, wherein factor $\theta_x$ is defined by the formula $\theta_x = 180 - \alpha - Q$ and factor Q is equal to B if $$K = \frac{a}{b} \frac{\sin B}{\sin A},$$

or is equal to A if $$K = \frac{b}{a} \frac{\sin A}{\sin B};$$

and
means for obtaining a value X, wherein X is defined by the formula $$X = \frac{b \sin \theta_x}{\sin B}$$

if factor Q is equal to B, or by the formula $$X = \frac{a \sin \theta_x}{\sin A}$$

if factor Q is equal to A, thereby obtaining values corresponding, respectively, to the distance between the observation point and said third reference point, or to the distance between the observation point and said first reference point; or by the formula $$X = \frac{a \sin \alpha}{\sin A} \text{ if } K = \frac{a}{b} \frac{\sin B}{\sin A}, \text{ or}$$
$$X = \frac{b \sin \alpha}{\sin B} \text{ if } K = \frac{b}{a} \frac{\sin A}{\sin B},$$

thereby obtaining a value corresponding to the distance between the observation point and said second reference point.

3. The apparatus of claim 1 wherein the reference points constitute first, second and third reference points, with said second reference point being intermediate said first and third reference points, and the magnitude of the included angles defined between said first and second and said second and third reference points, respectively, constitute the values A and B, respectively, and the magnitudes of the distances between said first and second, second and third, and first and third reference points constitute values a, b, and c, respectively, and said means for mathematically determining the relative map location of the observation point comprises means for performing the following sequence of steps:

substituting effective vales A', B', a', b' and c' for values A, B, a, b, and c, respectively, in the formulas herein if values A or value B equals 180°, wherein A'=B, B'=180°−B, a'=c, b'=a, and c'=b, if A=180°, and A'=180°−A, B'=A, a'=b, b'=c, c'=a, if B=180°;

obtaining the value of a factor $\alpha$, wherein said factor $\alpha$ corresponds to the included angled defined between one of said first and third reference points and said second reference point and the observation point, and is defined by the formula $\alpha = \arctan M$, if factor M is positive, and by the formula $\alpha = 180° - \arctan |M|$, if factor M is negative, for all values of a factor L wherein $L \neq 0°$ or 180°, and by the formula $\alpha = 90°$ when $L = 0°$ or 180°, factor M is defined by the formula $$M = \frac{\sin L}{K + \cos L},$$

factor L is defined by the formula $L = |\theta_o - (A+B)|$, factor $\theta_o$ is defined by the formula $\theta_o = \theta_o'$ if $A+B > 180°$ and if $A+B \leq 180°$, $\theta_o$ equals the one of the values $\theta_o'$, or $360° - \theta_o'$, which results in values of value X obtained as set forth hereinbelow such that the calculated value of angle A or B, as determined by a formula employing distance a or b, respectively, and at least one of the calculated values of value X equals the measured value of angle A or B, $$\theta_o' = 2\tan^{-1}\sqrt{\frac{(s-a)(s-b)}{s(s-c)}},$$

factor s is defined by the formula $s=\frac{1}{2}(a+b+c)$, and factor K is defined either by the formula $$K = \frac{a}{b} \frac{\sin B}{\sin A}$$

or by the formula $$K = \frac{b}{a} \frac{\sin A}{\sin B};$$

obtaining the value of a factor $\theta_x$, wherein factor $\theta_x$ is defined by the formula $\theta_x = 180 - \alpha - Q$ and factor Q is equal to B if $$K = \frac{a}{b} \frac{\sin B}{\sin A},$$

or is equal to A if $$K = \frac{b}{a} \frac{\sin A}{\sin B};$$

and
obtaining a value X, wherein X is defined by the formula $$X = \frac{b \sin \theta_x}{\sin B}$$

if factor Q is equal to B, or by the formula $$X = \frac{a \sin \theta_x}{\sin A}$$

if factor Q is equal to A, thereby obtaining values corresponding, respectively, to the distance between the observation point and said third reference point, or to the distance between the observation point and said first reference point; or by the formula $$X = \frac{a \sin \alpha}{\sin A} \text{ if } K = \frac{a}{b} \cdot \frac{\sin B}{\sin A}, \text{ or}$$
$$X = \frac{b \sin \alpha}{\sin B} \text{ if } K = \frac{b}{a} \cdot \frac{\sin A}{\sin B},$$

thereby obtaining a value corresponding to the distance between the observation point and said second reference point.

4. The apparatus of claim 3 wherein said means for performing said sequence of steps comprises computer means programmed to perform said sequence of steps.

5. Apparatus for plotting on a map the location of an observation point with respect to a reference point charted on the map, the apparatus comprising:
plotter means defining a position point,
  indicia means defining a position point,
  drive means for effecting relative displacement of the map and said position point with respect to each other such that said position point may be aligned with different map locations;
means operable when actuated for determining the relative location of the observation point with respect to the reference point;
means responsive to said relative location determining means for translating the relative location of the observation point into a corresponding relative position of the map with respect to a reference map position; and
means responsive to said translating means for controlling said plotter means so as to position the map with respect to said position point such that the map location corresponding to the relative location of the observation point is aligned with said position point.

6. The apparatus of claim 5 wherein the reference point constitutes a first reference point, and said means for determining the relative location of the observation point comprises means for determining the distance X between the reference point and the observation point, said distance X determining means comprising:
  means operable when actuated for obtaining the magnitude A of a first included angle between said first reference point and a second reference point, and for obtaining the magnitude B of a second included angle between said second reference point and a third reference point, said third reference point being spaced from said first and second reference points such that said first, second, and third reference points define a triangle;
  means operable when actuated for measuring the distances between said first, second, and third reference points, the value of the distance between said first and second points being defined as a, the value of the distance between said second and third points being defined as b, and the value of the distance between said first and third reference points being defined as c;

means for substituting effective values A', B', a', b', and c' for values A, B, a, b, and c, respectively in the formulas herein if value A or value B equals 180°, wherein A'=B, B'=180°−B, a'=c, b'=a, and c'=b, if A=180°, and A'=180°−A, B'=A, a'=b, b'=c, c'=a, if B=180°;

means for obtaining the value of a factor $\alpha$, wherein said factor $\alpha$ corresponds to the included angle defined between one of said first and third points and said second point and the observation point, and is defined by the formula $\alpha = \arctan M$, if factor M is positive, and by the formula $\alpha = 180° - \arctan |M|$, if factor M is negative, for all values of a factor L wherein L$\neq$0° or 180°, and by the formula $\alpha = 90°$ when L=0° or 180°, factor M is defined by the formula $$M = \frac{\sin L}{K + \cos L},$$

factor L is defined by the formula $L = |\theta_o - (A+B)|$, factor $\theta_o$ is defined by the formula $\theta_o = \theta_o'$ if $A+B > 180°$ and if $A+B \leq 180°$, $\theta_o$ equals the one of the values $\theta_o'$, or $360° - \theta_o'$, which results in values of value X obtained as set forth hereinbelow such that the calculated value of angle A or B, as determined by a formula employing distance a or b, respectively, and at least one of the calculated values of value X, equals the measured value of angle A or B, $$\theta_o' = 2 \tan^{-1}\left[\sqrt{\frac{(s-a)(s-b)}{s(s-c)}}\right],$$

factor s is defined by the formula $s = \frac{1}{2}(a+b+c)$, and factor K is defined either by the formula $$K = \frac{a}{b} \cdot \frac{\sin B}{\sin A}$$

or by the formula $$K = \frac{b}{a} \cdot \frac{\sin A}{\sin B};$$

means for obtaining the value of a factor $\theta_x$, wherein factor $\theta_x$ is defined by the formula $\theta_x = 180 - \alpha - Q$ and factor Q is equal to B if $$K = \frac{a}{b} \cdot \frac{\sin B}{\sin A},$$

or is equal to A if $$K = \frac{b}{a} \cdot \frac{\sin A}{\sin B};$$

and
means for obtaining a value X, wherein X is defined by the formula $$X = \frac{b \sin \theta_x}{\sin B}$$

if factor Q is equal to B, or by the formula $$X = \frac{a \sin \theta_x}{\sin A}$$

if factor Q is equal to A, and if said first reference point is disposed with respect to said second and third reference points so as to constitute an end point, or by the formula $$X = \frac{a \sin \alpha}{\sin A} \text{ if } K = \frac{a}{b} \quad \frac{\sin B}{\sin A}, \text{ or}$$

$$X = \frac{b \sin \alpha}{\sin B} \text{ if } K = \frac{b}{a} \quad \frac{\sin A}{\sin B},$$

and if said reference point is disposed with respect to said second and third reference points so as to constitute the intermediate point.

7. The apparatus of claim 5 wherein said translating means comprises:
   means responsive to the relative displacement of the map and said position point for determining the relative position of the map with respect to said reference map position.

8. The apparatus of claim 7 wherein said means for determining the relative location of the observation point comprises means operable when actuated for determining the distance X between the reference point and the observation point, said plotter drive means comprises means for effecting relative displacement of the map and said position point in first and second directions which are parallel to a first coordinate axis, and to a second coordinate axis, respectively,
   said relative map position determining means comprises tracking means for producing first and second outputs indicative of the net relative displacement of the map and said position point with respect to said reference map position in a first coordinate direction corresponding to said first coordinate axis, and in a second coordinate direction corresponding to said second coordinate axis, respectively; and
   said translating means further comprises:
      means operable when actuated for controlling said plotter drive means so as to position the map and said position point with respect to each other such that said position point is aligned with a selected map location, and obtaining, as the relative position coordinates for the selected map location, the values of said first and second outputs which are obtained by said tracking means when the selected map location and said position point are in alignment with each other, and
      means responsive to said relative position coordinate obtaining means for determining the relative position coordinates of the observation point by resolving said distance X into first and second components corresponding, respectively, to the magnitude and relative direction of relative displacement of the map and said position point between the reference point and the observation point with respect to said first coordinate axis and with respect to said second coordinate axis, and algebraically adding the values of said first and second distance X components to the corresponding relative position coordinates for the reference point; and
   said plotter controlling means comprises means for comparing the relative position coordinates of the map location aligned with the position point with the relative position coordinates determined for the observation point and selectively generating first and second drive control signals in dependence on the comparison so as to cause relative displacement of the map and said position point with respect to said first and second coordinate axes, respectively, such that the map location corresponding to the relative location of the observation point is brought into alignment with said position point.

9. The apparatus of claim 8 wherein said tracking means comprises means for determining the magnitude of each relative displacement of the map and said position point and algebraically summing the individual relative displacements away from and toward said reference map position with respect to said first coordinate axis and with respect to said second coordinate axis, respectively.

10. The apparatus of claim 8 wherein the reference point constitutes a first reference point, said first and second coordinate axes are orthogonal, and said means for determining the relative position coordinates of the observation point comprise:
   means operable when actuated for determining the magnitude A of the included angle defined between the observation point and said first reference point and a second charted reference point;
   means for comparing the second reference point position coordinates, denoted $R2_x$ and $R2_y$, with the first reference point coordinates, denoted $R1_x$ and $R1_y$, to obtain the differences in values $X_{12}$ and $Y_{12}$, respectively, between corresponding coordinates;
   means for obtaining the value of a factor $\alpha_A$, which corresponds to the included angle defined between said first reference point and the observation point and said second reference point;
   means for obtaining a value $\alpha_R$, wherein said value $\alpha_R$ is defined as follows:
   I. If $R2_x > R1_x$ and $R2_y > R1_y$, then $$\alpha_R = \tan^{-1} \frac{|X_{12}|}{|Y_{12}|},$$

II. If $R2_x > R1_x$ and $R2_y < R1_y$, then $$\alpha_R = 180° - \tan^{-1} \frac{|X_{12}|}{|Y_{12}|},$$

III. If $R2_x < R1_x$ and $R2_y < R1_y$, then $$\alpha_R = \tan^{-1} \frac{|X_{12}|}{|Y_{12}|} + 180°,$$

IV. If $R2_x < R1_x$ and $R2_y > R1_y$, then $$\alpha_R = 360° - \tan^{-1} \frac{|X_{12}|}{|Y_{12}|},$$

V. If $R2_x = R1_x$ and $R2_y > R1_y$, then $\alpha_R = 0°$,
   VI. If $R2_x = R1_x$ and $R2_y < R1_y$, then $\alpha_R = 180°$,
   VII. If $R2_x > R1_x$ and $R2_y = R1_y$, then $\alpha_R = 90°$,
   VIII. If $R2_x < R1_x$ and $R2_y = R1_y$, then $\alpha_R = 270°$;
   means for obtaining a value $\alpha_S$, wherein said value $\alpha_S$ is defined as follows:

$$\alpha_S = \alpha_R + \alpha_A + A, \text{ if } A + B \leq 180°, \text{ and}$$

by the formula $$\alpha_s = \alpha_R + \alpha_A + A - 180° \text{ if } A+B > 180°;$$

means for obtaining a first value $X_x$ corresponding to the value of said first component of distance X, wherein said value $X_x$ is defined by the formula $X_x = X \sin \alpha_s$;

means for adding value $X_x$ to, or subtracting value $X_x$ from the value of the corresponding first reference point relative position coordinate to obtain the value of the corresponding observation point relative position coordinate if $\sin \alpha_s$ is, respectively, positive or negative;

means for obtaining a second value $X_y$ corresponding to the value of said second component of distance X, wherein said value $X_y$ is defined by the formula $X_y = X \cos \alpha_s$; and means for adding value $X_y$ to, or subtracting value $X_y$ from the value of the corresponding first reference point relative position coordinate to obtain the value of the corresponding observation point relative position coordinate if $\cos \alpha_s$ is, respectively, positive or negative.

11. The apparatus of claim 10 wherein said means for obtaining the value of said factor $\alpha_A$ comprises:

means operable when actuated for obtaining the magnitude B of a second included angle between said second reference point and a third charted reference point, said third reference point being spaced from said first and second reference points such that said first, second, and third reference points define a triangle;

means operable when actuated for measuring the distances between said first, second and third reference points, the value of the distance between said first and second reference points being defined as a, the value of the distance between said second and third reference points being defined b, and the value of the distance between said first and third reference points being defined as c;

means for substituting effective values A', B', a', b', and c' for values A, B, a, b, and c, respectively in the formulas herein if value A or value B equals 180°, wherein A'=B, B'=180°−B, a'=c, b'=a, and c'=b, if A=180°, and A'=180°−A, B'=A, a'=b, b'=c, c'=a, if B=180°;

means for computing, as the value of $\alpha_A$, for all values of a factor L wherein L≠0° or 180°, the arctangent of a factor M, if factor M is positive, and the value of 180°−arctan |M|, if factor M is negative, wherein factor M is defined by the formula $$M = \frac{\sin L}{K + \cos L},$$

factor L is defined by the formula $L = |\theta_o - (A+B)|$, factor $\theta_o$ is defined by the formula $\theta_o = \theta_o'$ if $A+B > 180°$ and if $A+B \leq 180°$, $\theta_o$ equals the one of the values $\theta_o'$, or $360° - \theta_o'$, which results in values of distance X obtained as set forth hereinbelow such that the calculated value of angle A or B, as determined by a formula employing distance a or b, respectively, and at least one of the calculated values of distance X equals the measured value of angle A or B, $$\theta_o' = 2 \arctan \sqrt{\frac{(s-a)(s-b)}{s(s-c)}},$$

factor s is defined by the formula $s = \frac{1}{2}(a+b+c)$, and factor K is defined either by the formula $$K = \frac{a}{b} \cdot \frac{\sin B}{\sin A}$$

or by the formula $$K = \frac{b}{a} \cdot \frac{\sin A}{\sin B},$$

and for obtaining, as the value of $\alpha_A$, a value of 90° when factor L=0° or 180°, and said means for determining distance X comprises means for obtaining the value of a factor $\theta_x$, wherein factor $\theta_x$ is defined by the formula $\theta_x = 180 - \alpha_A - Q$ and factor Q is equal to B if $$K = \frac{a}{b} \cdot \frac{\sin B}{\sin A},$$

or is equal to A if $$K = \frac{b}{a} \cdot \frac{\sin A}{\sin B};$$

and means for obtaining, as the value of distance X, the value of:

$$\frac{b \sin \theta_x}{\sin B}$$

if factor Q is equal to B, or the value of:

$$\frac{a \sin \theta_x}{\sin A}$$

if factor Q is equal to A, and if said first reference point is disposed with respect to said second and third reference points so as to constitute an end point, or the value of:

$$\frac{a \sin \alpha_A}{\sin A} \text{ if } K = \frac{a}{b} \cdot \frac{\sin B}{\sin A}, \text{ or}$$

$$\frac{b \sin \alpha_A}{\sin B} \text{ if } K = \frac{b}{a} \cdot \frac{\sin A}{\sin B},$$

and if said first reference point is disposed with respect to said second and third reference points so as to constitute the intermediate point.

12. The apparatus of claim 10 wherein the map has a plurality of scales, each one of which applies to a predetermined region of the map, such that the physical distance between two map locations corresponds to a predetermined scale distance in dependence upon the relative locations of the two map locations, and said tracking means comprises:

means for producing first and second scale signals proportional to the map scale distances corresponding to the magnitude and relative location of each relative displacement of the map and said position point away from and toward said reference map position with respect to said first coordinate axis and with respect to said second coordinate axis, respectively, and means for algebraically summing the individual ones of said first and second scale signals, respectively.

13. The apparatus of claim 12 wherein:

said means for effecting relative displacement of the map and said position point in directions parallel to said first and second coordinate axes are adapted such that relative displacement is effected in increments of predetermined length, and said scale signal producing means is constructed so as to produce said scale signals in the form of a predetermined number of pulses per increment of relative displacement of the map and said position point in dependence upon scale(s) which apply to the map locations which are aligned with said position point during an increment of relative displacement.

14. The apparatus of claim 10 wherein said means for obtaining value $\alpha_A$ comprises:

means for substituting effective values A', B', a', b', and c' for values A, B, a, b, and c, respectively in the formulas herein if value A or value B equals 180°, wherein A'=B, B'=180°−B, a'=c, b'=a, and c'=b, if A=180°, and A'=180°−A, B'=A, a'=b, b'=c, c'=a, if B=180°;

means for obtaining the arctangent of a value M, if value M is positive, and for obtaining the value of: 180°−arctan |M|, if value M is negative, wherein value M is defined by the formula:

$$M = \frac{\sin L}{K + \cos L};$$

L is defined by the formula:

$$L = |\theta_o - (A+B)|,$$

B is the value of the included angle defined by the observation point, said second charted reference point, and a third charted reference point, said third charted reference point being spaced from said first and second charted reference points such that said charted reference points define a triangle; $\theta_o = \theta_o'$ if A+B>180° and if A+B≦180°, $\theta_o$ equals the one of the values $\theta_o'$, or 360°−$\theta_o'$, which results in values of distance X derived in accordance with the following formulas:

$$X = \frac{a \sin \theta_A}{\sin A}, \text{ where } \theta_A = 180 - \alpha_A - A,$$

if said first charted reference point is disposed relative to said second and third charted reference points so as to be an end point, and $$X = \frac{b \sin \alpha_A}{\sin B},$$

if said first charted reference point is disposed relative to said second and third charted reference points so as to be the intermediate point, such that the calculated value of angle A or B, as determined by a formula employing distance a or b, respectively, and at least one of the calculated values of distance X equals the measured value of A or B, $$\theta_o' = 2 \tan^{-1} \sqrt{\frac{(s-a)(s-b)}{s(s-c)}};$$

s is defined by the formula:

$$s = \tfrac{1}{2}(a+b+c),$$

where a is the value of the scale distance between said first and second charted reference points, b is the value of the scale distance between said second and third reference points, and c is the value of the scale distance between said first and third reference points, and K is defined by the formula:

$$K = \frac{b}{a} \cdot \frac{\sin A}{\sin B}.$$

15. The apparatus of claim 14 wherein said means for determining distance X comprises:

means for obtaining, if said first charted reference point is disposed relative to said second and third charted reference points so as to be an end point, a value $\theta_A$, wherein $\theta_A$ is defined by the formula: $\theta_A = 180 - \alpha_A - A$; and the value of $$\frac{a \sin \theta_A}{\sin A},$$

which value corresponds to distance X;

and if said first charted reference point is disposed relative to said second and third charted reference points so as to be the intermediate point, then the value of:

$$\frac{b \sin \alpha_A}{\sin B},$$

which value corresponds to distance X.

16. The apparatus of claim 12 wherein said means for obtaining value $\alpha_A$ comprises means for obtaining the arctangent of a value M, wherein value M is defined by the formula:

$$M = \frac{\sin L}{K + \cos L};$$

L is defined by the formula:

$$L = |\theta_o - (A+B)|,$$

B is the value of the included angle defined by the observation point, said second charted reference point, and a third charted reference point, said third charted reference point being spaced from said first and second charted reference points such that said second charted reference point is intermediate said first and third charted reference points, as viewed from the observation point, and such that said charted reference points define a triangle; $\theta_o$ is defined by the formula $\theta_o = \theta_o'$ if A+B>180° and if A+B≦180°, $\theta_o$ equal the one of the values $\theta_o'$ or 360°−$\theta_o'$, which results in values of distance X derived in accordance with the following formulas:

$$X = \frac{a \sin \theta_A}{\sin A}, \text{ where } \theta_A = 180° - \alpha_A - A,$$

if said first charted reference point is disposed relative to said second and third charted reference points so as to be an end point, and $$X = \frac{b \sin \alpha_A}{\sin B},$$

if said first charted reference point is disposed relative to said second and third charted reference points so as to be the intermediate point, such that the calculated value of angle A or B, as determined by a formula employing distance a or b, respectively, and at least one of the calculated values of distance X equals the measured value of angle A or B, $$\theta_0' = 2 \tan^{-1}\left[\sqrt{\frac{(s-a)(s-b)}{s(s-c)}}\right],$$

s is defined by the formula:

$$s = \tfrac{1}{2}(a+b+c),$$

where a is the value of the scale distance between said first and second charted reference points, b is the value of the scale distance between said second and third reference points, and c is the value of the scale distance between said first and third reference points, and
K is defined by the formula:

$$K = \frac{b}{a} \cdot \frac{\sin A}{\sin B}.$$

17. The apparatus of claim 16 wherein said means for obtaining $\alpha_A$ comprises means for obtaining distance a which comprises:
means for comparing the values of the corresponding relative position coordinates of said first and second charted reference points and obtaining values corresponding to the net first coordinate direction distance and the net second coordinate direction distance between said first and second charted reference points; and
means for obtaining the square root of the sum of the square of said net first coordinate direction distance value and the square of said net second coordinate direction distance value, thereby obtaining a value corresponding to value a.

18. Apparatus for defining without the need for a predetermined frame of reference the relative location of a point of position with respect to at least one reference point comprising:
plotter means comprising:
a chart on which the reference point is denoted at a predetermined chart location,
indicia means defining a position point, and
drive means for effecting relative displacement of said chart and said position point with respect to each other such that said position point may be aligned with different chart locations;
means responsive to the relative displacement of the chart and said position point for determining the relative position of said chart with respect to a reference position of said chart;
means operable when actuated and responsive to said chart position determining means for translating chart locations into corresponding relative chart positions;
means responsive to said translating means for determining the relative chart position corresponding to the relative location of the point of position;
means responsive to said relative chart position determining means for comparing the corresponding relative chart positions for the reference point and the point of position and producing an output indicative of the relative location of the point of position with respect to the reference point.

19. The apparatus of claim 18 further comprising means for displaying the output of said corresponding relative chart position comparing means.

20. The apparatus of claim 19 wherein said output displaying means comprises means for dispaying the relative location of the point of position in digital form.

21. The apparatus of claim 19 wherein said output displaying means comprises means for controlling said plotter means so as to position said chart with respect to said position point such that the map location corresponding to the relative location of the point of position is aligned with said position point.

22. The apparatus of claim 18 wherein: said plotter drive means comprises means for effecting relative displacement of said chart and said position point in first and second directions which are parallel to a first coordinate axis, and to a second coordinate axis, respectively; and
said relative chart position determining means comprises:
tracking means for producing first and second outputs indicative of the net relative displacement of said chart and said position point with respect to said reference map position in a first coordinate direction corresponding to said first coordinate axis, and in a second coordinate direction corresponding to said second coordinate axis, and
said translating means comprises means operable when actuated for controlling said plotter drive means so as to position said chart and said position point with respect to each other such that said position point is aligned with a selected chart location, and obtaining, as relative position coordinates for the selected map location, the values of said first and second outputs which are obtained by said tracking means when said position point is so aligned with the selected map location.

23. Apparatus for plotting on a map the location of an observation point with respect to a predetermined location reference point charted on the map, the apparatus comprising:
plotter means comprising:
indicia means for defining a position point,
drive means for effecting relative displacement of the map and said position point with respect to each other such that said position point may be aligned with different map locations;
means for determining the relative location of the observation point with respect to the reference point;
means operable when actuated and responsive to said relative location determining means and to the relative displacement of the map and said position point for translating the relative location of the observation point into a corresponding relative position of the map with respect to a reference map position; and means responsive to said translating means for controlling said plotter means so as to position the map with respect to said position point such that the map location corresponding to the relative location of the observation point is aligned with said position point.

24. The apparatus of claim 23 wherein said relative location determining means comprises:

means for obtaining the distances between three predetermined charted reference points which include the location reference point and which are spaced with respect to each other so as to define a triangle, and such that no two of the charted reference points are colinear with the observation point;

means for determining the included angles defined by said three charted reference points and the observation point; and means operable when actuated and responsive to said distance determining means and to said angle determining means for mathematically determining the relative location of the observation point with respect to the location reference point based on said included angles and said distances between said three reference points.

25. The apparatus of claim 23 wherein said means for determining the relative location of the observation point comprises means for determining the distance X between the reference point and the observation point, said plotter drive means comprises means for effecting relative displacement of the map and said position point in first and second directions which are parallel to a first coordinate axis, and to a second coordinate axis, respectively;

said translating means comprises:

tracking means for producing first and second outputs indicative of the net relative displacement of the map and said position point with respect to said reference map position in a first coordinate direction corresponding to said first coordinate axis, and a second coordinate direction corresponding to said second coordinate axis, respectively, means operable when actuated for controlling said plotter drive means so as to position the map and said position point with respect to each other such that said position point is aligned with a selected map location, and obtaining, as the relative position coordinates for the selected map location, the values of said first and second outputs which are obtained by said tracking means when the selected map location and said position point are in alignment with each other, and means operable when actuated and responsive to said relative position coordinate obtaining means for determining the relative position coordinates of the observation point by resolving said distance X into first and second components corresponding, respectively, to the magnitude and relative direction of relative displacement of the map and said position point between the reference point and the observation point with respect to said first coordinate axis and with respect to said second coordinate axis, and algebraically adding the values of said first and second distance X components to the corresponding relative position coordinates for the reference point; and said plotter controlling means comprises means for comparing the relative position coordinates of the map location aligned with the position point with the relative position coordinates determined for the observation point and selectively generating first and second drive control signals in dependence on the comparison so as to cause relative displacement of the map and said position point with respect to said first and second coordinate axes, respectively, such that the map locations corresponding to the relative location of the observation point is brought into alignment with said position point.

26. The apparatus of claim 25 wherein the reference point constitutes a first reference point, said first and second coordinate axes are orthogonal, and said means for determining the relative position coordinates of the observation point comprise:

means operable when actuated for determining the magnitude A of the included angle defined between the observation point and said first reference point and a second predetermined charted reference point;

means for comparing the second reference point position coordinates, denoted $R2_x$ and $R2_y$, with the first reference point coordinates, denoted $R1_x$ and $R1_y$, to obtain the differences in values $X_{12}$ and $Y_{12}$, respectively, between corresponding coordinates;

means for obtaining the value of a factor $\alpha_A$, which corresponds to the included angle defined between said first reference point and the observation point and said second reference point;

means for obtaining a value $\alpha_R$, wherein said value $\alpha_R$ is defined as follows:

I. If $R2_x > R1_x$ and $R2_y > R1_y$, then $$\alpha_R = \tan^{-1} \frac{|X_{12}|}{|Y_{12}|},$$

II. If $R2_x > R1_x$ and $R2_y < R1_y$, then $$\alpha_R = 180° - \tan^{-1} \frac{|X_{12}|}{|Y_{12}|},$$

III. If $R2_x < R1_x$ and $R2_y < R1_y$, then $$\alpha_R = \tan^{-1} \frac{|X_{12}|}{|Y_{12}|} + 180°,$$

IV. If $R2_x < R1_x$ and $R2_y > R1_y$, then $$\alpha_R = 360° - \tan^{-1} \frac{|X_{12}|}{|Y_{12}|},$$

V. If $R2_x = R1_x$ and $R2_y > R1_y$, then $\alpha_R = 0°$,
VI. If $R2_x = R1_x$ and $R2_y < R1_y$, then $\alpha_R = 180°$,
VII. If $R2_x > R1_x$ and $R2_y = R1_y$, then $\alpha_R = 90°$,
VIII. If $R2_x < R1_x$ and $R2_y = R1_y$, then $\alpha_R = 270°$;

means for obtaining a value $\alpha_S$, wherein said value $\alpha_S$ is defined as follows:

$\alpha_S = \alpha_R + \alpha_A + A$, if $A + B \leq 180°$, and by the formula:

$\alpha_S = \alpha_R + \alpha_A + A - 180°$, if $A + B > 180°$;

means for obtaining a first value $X_x$ corresponding to the value of said first component of distance X, wherein said value $X_x$ is defined by the formula $X_x = X \sin \alpha_S$;

means for adding value $X_x$ to, or subtracting value $X_x$ from the value of the corresponding first reference point relative position coordinate to obtain the value of the corresponding observation point relative position coordinate if sin $\alpha_S$ is, respectively, positive or negative;

means for obtaining a second value $X_y$ corresponding to the value of said second component of distance X, wherein said value $X_y$ is defined by the formula $X_y = X \cos \alpha_S$; and means for adding value $X_y$ to, or subtracting value $X_y$ from the value of the corresponding first reference point relative position coordinate to obtain the value of the corresponding observation point relative position coordinate if cos $\alpha_S$ is, respectively, positive or negative.

27. The apparatus of claim 26 wherein said means for obtaining the value of said factor $\alpha_A$ comprises:

means operable when actuated for obtaining the magnitude B of a second included angle between said second reference point and a third predetermined charted reference point, said third reference point being spaced from said first and second reference points such that said first, second and third reference points define a triangle;

means for obtaining the distances between said first, second and third reference points, the value of the distance between said first and second reference points being defined as a, the value of the distance between said second and third reference points being defined as b, and the value of the distance between said first and third reference points being defined as c;

means for substituting effective values A', B', a', b' and c' for values A, B, a, b and c, respectively, in the formulas herein if value A or value B equals 180°, wherein A'=B', B'=180°−B, a'=c, b'=a, and c'=b, if A'=180°, and A'=180°−A, B'=A, a'=b, b'=c, and c'=a, if B=180°;

means for computing, as the value of $\alpha_A$, for all values of a factor L wherein L≠0° or 180°, the arctangent of a factor M, if factor M is positive, and the value of 180°−arctan |M|, if factor M is negative, wherein factor M is defined by the formula $$M = \frac{\sin L}{K + \cos L},$$

factor L is defined by the formula $L = |\theta_o - (A+B)|$, factor $\theta_o$ is defined by the formula $\theta_o = \theta_o'$ if $A+B<180°$ and if $A+B \leq 180°$, $\theta_o$ equals the one of the values $\theta_o'$, or $360° - \theta_o'$, which results in values of distance X obtained as set forth hereinbelow such that the calculated value of angle A or B, as determined by a formula employing distance a or b, respectively, and at least one of the calculated values of the distance X equals the measured value of angle A or B, $$\theta_o' = 2 \arctan \sqrt{\frac{(s-a)(s-b)}{s(s-c)}}$$

factor s is defined by the formula $s = \frac{1}{2}(a+b+c)$, and factor K is defined either by the formula $$K = \frac{a}{b} \cdot \frac{\sin B}{\sin A}$$

or by the formula $$K = \frac{b}{a} \cdot \frac{\sin A}{\sin B},$$

and for obtaining, as the value of $\alpha_A$, a value of 90° when factor L=0° or 180°, and said means for determining distance X comprises means for obtaining the values of a factor $\theta_x$, wherein factor $\theta_x$ is defined by the formula $\theta_x = 180 - \alpha_A - Q$ and factor Q is equal to B if $$K = \frac{a}{b} \cdot \frac{\sin B}{\sin A},$$

or is equal to A if $$K = \frac{b}{a} \cdot \frac{\sin A}{\sin B};$$

and
means for obtaining, as the value of distance X, the value of:

$$\frac{b \sin \theta_x}{\sin B}$$

if factor Q is equal to B, or the value of:

$$\frac{a \sin \theta_x}{\sin A}$$

if factor Q is equal to A, and if said first reference point is disposed with respect to said second and third reference points so as to constitute an end point, or the value of:

$$\frac{a \sin \alpha_A}{\sin A} \text{ if } K = \frac{a}{b} \cdot \frac{\sin B}{\sin A}, \text{ or}$$

$$\frac{b \sin \alpha_A}{\sin B} \text{ if } K = \frac{b}{a} \cdot \frac{\sin A}{\sin B},$$

and if said first reference point is disposed with respect to said second and third reference points so as to constitute the intermediate point.

* * * * *